(12) United States Patent
Verrall et al.

(10) Patent No.: US 6,899,929 B2
(45) Date of Patent: *May 31, 2005

(54) ANISOTROPIC POLYMER LAYER

(75) Inventors: Mark Verrall, Dorset (GB); Mark Goulding, Poole (GB); Quentin Hodges, Poole (GB); Ben Godden, Poole (GB)

(73) Assignee: Merck Patent GmbH, Darmstadt (DE)

( * ) Notice: Subject to any disclaimer, the term of this patent is extended or adjusted under 35 U.S.C. 154(b) by 142 days.

This patent is subject to a terminal disclaimer.

(21) Appl. No.: 09/859,482

(22) Filed: May 18, 2001

(65) Prior Publication Data

US 2001/0022998 A1 Sep. 20, 2001

Related U.S. Application Data

(62) Division of application No. 09/254,185, filed as application No. PCT/EP97/04827 on Sep. 5, 1997, now Pat. No. 6,291,035.

(30) Foreign Application Priority Data

Sep. 17, 1996 (EP) .............................................. 96114855

(51) Int. Cl.[7] .................................................. G02F 1/13
(52) U.S. Cl. .......................... 428/1.1; 428/1.3; 428/1.5; 252/299.01; 349/117
(58) Field of Search .......................... 428/1.1, 1.5, 1.3, 428/1.31; 252/229.01, 299.61; 349/117

(56) References Cited

U.S. PATENT DOCUMENTS

| | | | | |
|---|---|---|---|---|
| 4,084,884 A | * | 4/1978 | Raynes | ....................... 349/128 |
| 4,261,652 A | * | 4/1981 | Gray et al. | ............. 252/299.62 |
| 4,469,408 A | * | 9/1984 | Kruger et al. | ............... 349/127 |
| 4,892,392 A | * | 1/1990 | Broer | ......................... 349/124 |
| 5,122,295 A | * | 6/1992 | Weber et al. | ........... 252/299.01 |
| 5,171,469 A | * | 12/1992 | Hittich et al. | ........... 252/299.01 |
| 5,460,748 A | | 10/1995 | Mazaki et al. | |
| 5,506,704 A | | 4/1996 | Broer et al. | |
| 5,619,352 A | | 4/1997 | Koch et al. | |
| 5,762,823 A | * | 6/1998 | Hikmet | ................... 252/299.01 |
| 5,833,880 A | * | 11/1998 | Siemensmeyer et al. | ...................... 252/299.64 |
| 5,863,457 A | * | 1/1999 | Hasebe et al. | ......... 252/299.01 |
| 5,978,055 A | | 11/1999 | Van De Witte et al. | |
| 6,379,758 B1 | * | 4/2002 | Hanmer et al. | ............... 428/1.1 |

FOREIGN PATENT DOCUMENTS

| | | |
|---|---|---|
| EP | 0606940 | 7/1994 |
| EP | 0628847 | 12/1994 |
| WO | 9610768 | 4/1996 |
| WO | 9610770 | 4/1996 |

* cited by examiner

*Primary Examiner*—Harold Pyon
*Assistant Examiner*—Sow-Fun Hon
(74) *Attorney, Agent, or Firm*—Millen White Zelano & Branigan, P.C.

(57) ABSTRACT

The invention relates to an optical retardation film comprising two layers of an anisotropic polymer adjacent to each other or adjacent to both sides of a substrate, characterized in that each layer exhibits a tilted structure with an optical symmetry axis having a tilt angle θ relative to the plane of the layer, to a means to produce substantially linear polarized light comprising such an optical retardation film and to a liquid crystal display comprising such an optical retardation film.

20 Claims, 7 Drawing Sheets

ANISOTROPIC POLYMER LAYER

This application is a divisional application of U.S. application Ser. No. 09/254,185, filed 2 Mar. 1999, now U.S. Pat. No. 6,291,035 B1, issued 18 Sep. 2001, which was the National Stage of International Application No. PCT/EP97/04827, filed 5 Sep. 1997.

SUMMARY OF THE INVENTION

The invention relates to an optical retardation film comprising two layers of an anisotropic polymer that are adjacent to each other or adjacent to both sides of a common substrate, characterized in that each layer exhibits a tilted structure with an optical symmetry axis having a tilt angle θ relative to the plane of the layer.

The invention further relates to a method of preparing such an optical retardation film, to a means to produce substantially linear polarized light comprising such an optical retardation film and to a liquid crystal display comprising a display cell and such an optical retardation film.

Figure 1A:
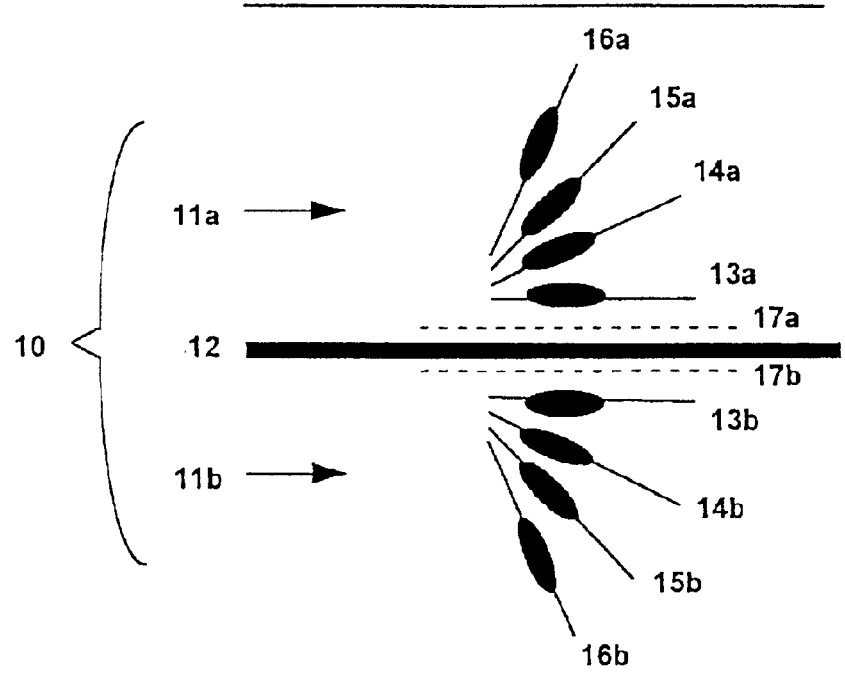
FIGS. 1a to 1c illustrate the structure of optical retardation films according to preferred embodiments of the present invention.

The European Patent Application EP 0 606 940-A1 discloses a cholesteric reflective polarizer that produces circular polarized light of a high luminance over a broad range of wavelengths. This polarizer can also be combined with a quarter wave foil or plate (QWF), which transforms the circular polarized light transmitted by the cholesteric polarizer into linear polarized light.

However, when a liquid crystal display comprising a cholesteric polarizer like that described in EP 0 606 940 is watched under an increasing viewing angle, its optical properties, like e.g. the luminance and the contrast ratio, are often deteriorating.

It has therefore been desired to have available an optical retardation film that, when used together with a broad waveband cholesteric circular reflective polarizer or a combination comprising a circular reflective polarizer and a quarter wave foil, like e.g. described in EP 0 606 940, improves the optical properties of the above mentioned circular reflective polarizer or combination over a wide range of viewing angles.

One of the aims of the present invention is to provide an optical retardation film having the properties described above. Another aim of the invention is to provide a means to produce substantially linear polarized light comprising such an optical retardation film and a broadband circular reflective polarizer. Other aims of the present invention are immediately evident to the person skilled in the art from the following detailed description.

It has now been found that these aims can be achieved by providing an optical retardation film comprising two layers of an anisotropic polymer that are adjacent to each other or adjacent to both sides of a substrate, characterized in that each layer exhibits a tilted structure with an optical symmetry axis having a tilt angle θ relative to the plane of the layer.

Furthermore it has been found that an optical retardation film as described above can also be used as a compensation film in conventional LC displays, like for example TN, STN or active matrix driven (AMD) TN displays, in order to compensate the viewing angle dependence of the electrooptical properties, like e.g. the contrast and grey scale, in these displays.

A retardation film with a tilted molecular structure is described in the WO 96/19770-A1, whereas the WO 96/19770-A1 discloses a retardation film with a tilted structure wherein the tilt angle varies continuously in a direction normal to the film. However, there is no hint to the combined use of such a retardation film with a broadband circular reflective polarizer in these documents.

One of the objects of the present invention is an optical retardation film comprising two layers of an anisotropic polymer that are adjacent to each other or adjacent to both sides of a common substrate, characterized in that each layer exhibits a tilted structure with an optical symmetry axis having a tilt angle θ relative to the plane of the layer.

In a preferred embodiment of the present invention the optical retardation film exhibits a tilted structure wherein the tilt angles of the two layers vary from one another.

In another preferred embodiment the optical retardation film exhibits a tilted structure wherein the tilt angle in each layer varies continuously, i.e. assumes a splay configuration, wherein the preferred embodiment is characterized in that either the direction of the variation or the amount of the starting values of the variation of the tilt angle are different between the two layers.

In the first layer according to this preferred embodiment the tilt angle θ varies, preferably continuously, in a direction normal to the layer from a minimum value $\theta_{min}$ on the side of the layer facing the second layer or, if present, the common intermediate substrate, to a maximum value $\theta_{max}$ on the opposite side of the layer, or the other way round.

In the second layer, the tilt angle varies, preferably continuously, in a direction normal to the layer, starting from a minimum value $\theta_{min}$ at the side of the layer facing the first layer or, if present, the common intermediate substrate, and ranging to a maximum value $\theta_{max}$ on the opposite side of the layer, as in the first layer.

In another preferred embodiment of the present invention, the tilt angle in the second layer varies in the opposite direction of the first layer, i.e. when the first layer varies from $\theta_{min}$ to $\theta_{max}$, the second varies from $\theta_{max}$ to $\theta_{min}$, and vice versa.

In a preferred embodiment of the present invention, the minimum tilt angle $\theta_{min}$ in each layer is substantially zero degrees.

In another preferred embodiment of the present invention the optical retardation film exhibits structure wherein the projection of the optical symmetry axis of the first layer into the plane of the layer and the projection of the optical symmetry axis of the second layer into the plane of the layer are twisted relative to each other at an angle ρ in the plane of the interface between the layers, said angle ρ being preferably from 0 to 90 degrees.

In a preferred embodiment of the present invention the angle ρ is substantially 0 degrees.

In another preferred embodiment of the present invention the retardation of the optical retardation film is from 50 to 250 nm.

Another object of the present invention is an optical retardation film as described above that is obtainable by a method comprising the following steps A) coating a mixture comprising
   a) a polymerizable mesogenic material comprising at least one polymerizable mesogen having at least one polymerizable functional group,
   b) an initiator, and
   c) optionally a solvent
   on a substrate or between a first and a second substrate in form of a layer,
B) aligning the polymerizable mesogenic material in the coated layer into a tilted and optionally a splayed structure.
C) polymerizing said mixture of a polymerizable mesogenic material by exposure to heat or actinic radiation,
D) optionally removing the substrate or, if two substrates are present, one or two of the substrates from the polymerized material, and
E) repeating the steps A), B), C) and optionally step D) at least one more time.

In a preferred embodiment of the present invention the steps A), B) and C) are carried out on both sides of one substrate.

In another preferred embodiment of the present invention the mixture of the polymerizable mesogenic material used in the method described above comprises at least one polymerizable mesogen having one polymerizable functional group and at least one polymerizable mesogen having two or more polymerizable functional groups.

In another preferred embodiment of the present invention the polymerizable mesogens are compounds of formula I

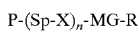   I wherein
P is a polymerizable group,
Sp is a spacer group having 1 to 20 C atoms,
X is a group selected from —O—, —S—, —CO—, —COO—, —OCO—, —OCOO— or a single bond,
n is 0 or 1,
MG is a mesogenic or mesogenity supporting group, preferably selected according to formula II

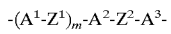   II wherein
$A^1$, $A^2$ and $A^3$ are independently from each other 1,4-phenylene in which, in addition, one or more CH groups may be replaced by N, 1,4-cyclohexylene in which, in addition, one or two non-adjacent $CH_2$ groups may be replaced by O and/or S, 1,4-cyclohexenylene or naphthalene-2,6-diyl, it being possible for all these groups to be unsubstituted, mono- or polysubstituted with halogen, cyano or nitro groups or alkyl, alkoxy or alkanoyl groups having 1 to 7 C atoms wherein one or more H atoms may be substituted by F or Cl, $Z^1$ and $Z^2$ are each independently —COO—, —OCO—, —$CH_2CH_2$—, —$OCH_2$—, —$CH_2O$—, —CH=CH—, —C≡C—, —CH=CH—COO—, —OCO—CH=CH— or a single bond,
m is 0, 1 or 2, and
R is an alkyl radical with up to 25 C atoms which may be unsubstituted, mono- or polysubstituted by halogen or CN, it being also possible for one or more non-adjacent $CH_2$ groups to be replaced, in each case independently from one another, by —O—, —S—, —NH—, —N($CH_3$)—, —CO—, —COO—, —OCO—, —OCO—O—, —S—CO—, —CO—S— or —C≡C— in such a manner that oxygen atoms are not linked directly to one another, or alternatively R is halogen, cyano or has independently one of the meanings given for P-(Sp-X)$_n$-.

Another object of the present invention is a means to produce substantially linear polarized light, comprising a broadband circular reflective polarizer and an optical retardation film as described in the foregoing and the following.

Another object of the present invention is a liquid crystal display comprising a display cell and an optical retardation film as described in the foregoing and the following.

Yet another object of the present invention is a liquid crystal display comprising a display cell and a means to produce substantially linear polarized light as described in the foregoing and the following.

As mentioned above, a preferred embodiment of the present invention is characterized in that the optical retardation film exhibits a tilted and splayed structure, wherein the tilt angle θ in each layer varies continuously in a direction normal to the layer, starting from a minimum value $θ_{min}$ at the side of the layer facing the other layer or, if present, facing the common intermediate substrate, and ranging to a maximum value $θ_{max}$ on the opposite side of the layer, or the other way round.

FIG. 1a depicts the structure of an optical retardation film 10 according to this preferred embodiment in side view, as an example that should illustrate, but not limit, the scope of the present invention. The optical retardation film 10 is comprising a first layer 11a and a second layer 11b of a polymerized mesogenic material on both sides of a common intermediate substrate 12.

Each of the layers 11a and 11b shown in FIG. 1a is exhibiting a tilted and splayed structure, wherein the mesogens of the polymerized material are oriented such that the major optical axes in different parts of the layer, of which locations at the surface are represented by lines 13a/b and 16a/b, and arbitrary intermediate locations are represented by lines 14a/b and 15a/b, each have a tilt angle θ relative to the plane of the layer, which is increasing in a direction normal to the layer, beginning with a minimum value $θ_{min}$ on the side of each layer facing the common substrate 12.

In the inventive optical retardation film that is shown in FIG. 1a, the mesogens on the side of each layer facing the substrate have a planar orientation, i.e. the major optical axes of these mesogens, represented by lines 13a and 13b, have a minimum tilt angle $θ_{min}$ that is substantially 0 degrees. However, other values of $θ_{min}$ are also possible.

The orientation of the optical axes in the two layers of the inventive optical retardation film depicted in FIG. 1a can further be described by an angle ρ in the plane of the common substrate 12 between the lines 17a and 17b, wherein 17a is representing the projection of the major optical axis in different parts of the first layer, indicated by lines 13a, 14a, 15a and 16a, into the plane of the first layer, and 17b is representing the projection of the major optical axis in different parts of the second layer, indicated by lines 13b, 14b, 15b and 16b, into the plane of the second layer.

Thus, this angle ρ gives the amount by which the two layers are twisted against each other.

In the preferred embodiment shown in FIG. 1a, the angle ρ between lines 17a and 17b is substantially zero degrees. However, other values of ρ are also possible.

Figure 1B:
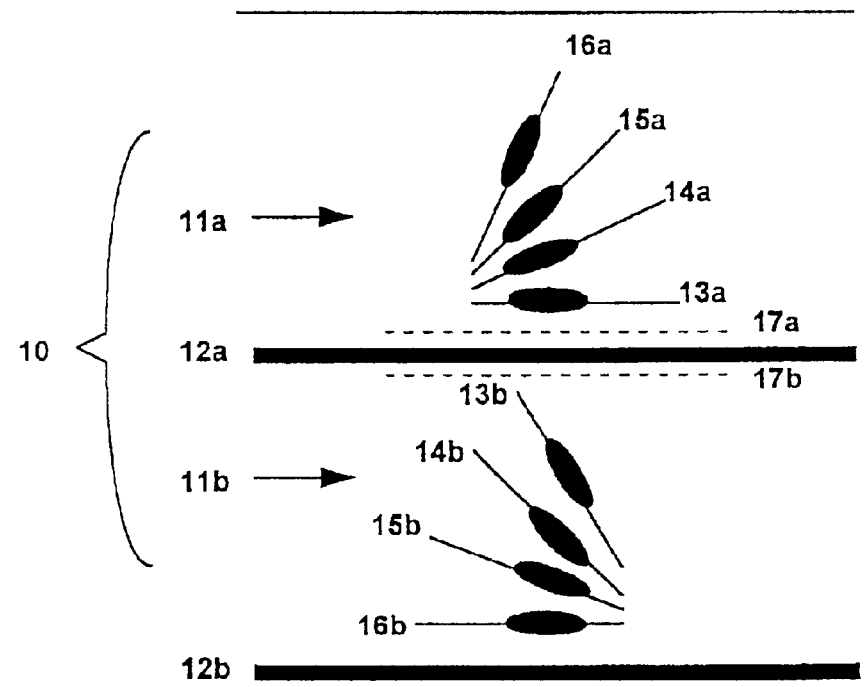

FIG. 1b illustrates the molecular structure of an optical retardation film 10 according to another preferred embodiment of the present invention. The numbered elements in FIG. 1b have the same meaning as given for FIG. 1a. The film 10 in FIG. 1b consists of two layers 11a and 11b that are coated on two substrates 12a and 12b, wherein the tilt angle θ in each layer 11a and 11b varies continuously in a direction normal to the layer, beginning on the side of each layer facing the common substrate 12a between the layers with a minimum value $\theta_{min}$ in the first layer 11a and a maximum value $\theta_{max}$ in the second layer 11b.

In an inventive optical retardation film according to the preferred embodiment which is exemplarily described in FIGS. 1a and 1b, the sense of variation of the tilt angle θ in each layer may be clockwise or counterclockwise when going from low values to high values of θ, and when looking at the layer in side view. The sense of variation of the tilt angle θ can be the same or different in both layers. Preferably the sense of variation is opposite in the two layers, as for example depicted in FIGS. 1a and 1b.

In the optical retardation films according to the preferred embodiment which is described above, and which is examplarily depicted in FIGS. 1a and 1b, the minimum tilt angle $\theta_{min}$ is preferably from 0 to 20 degrees, in particular from 0 to 10 degrees, most preferably from 0 to 5 degrees.

The maximum tilt angle $\theta_{max}$ in an optical retardation film according to this preferred embodiment is preferably from 20 to 90 degrees, in particular from 30 to 90 degrees, most preferably from 35 to 90 degrees.

Preferably the tilt angles of the two layers a and b at surfaces facing each other either directly or via a common substrate are the same, that is either $\theta_{min,\ a} = \theta_{min,\ b}$ or $\theta_{max,\ a} = \theta_{max,\ b}$. Very preferably both the minimum and the maximum tilt angle of the two layers are the same, that is $\theta_{min,\ a} = \theta_{min,\ b}$ and $\theta_{max,\ a} = \theta_{max,\ b}$.

In another preferred embodiment of the present invention, the optical retardation film is characterized in that the tilt angle θ is substantially constant in each layer. The molecular structure of an optical retardation film according to this preferred embodiment is exemplarily described in FIG. 1c, wherein the numbered elements have the same meanings as given for FIG. 1a.

Thus, an optical retardation film according to this preferred embodiment can be described by one tilt angle θ for each layer, which is ranging from 0 to 90 degrees, with the tilt angle in the first layer and the tilt angle in the second layer being independent of one another but preferably having substantially the same value.

The tilt angle θ according to this preferred embodiment is preferably from 5 to 80 degrees, in particular from 15 to 70 degrees, very preferably from 25 to 60 degrees.

Figure 1C:
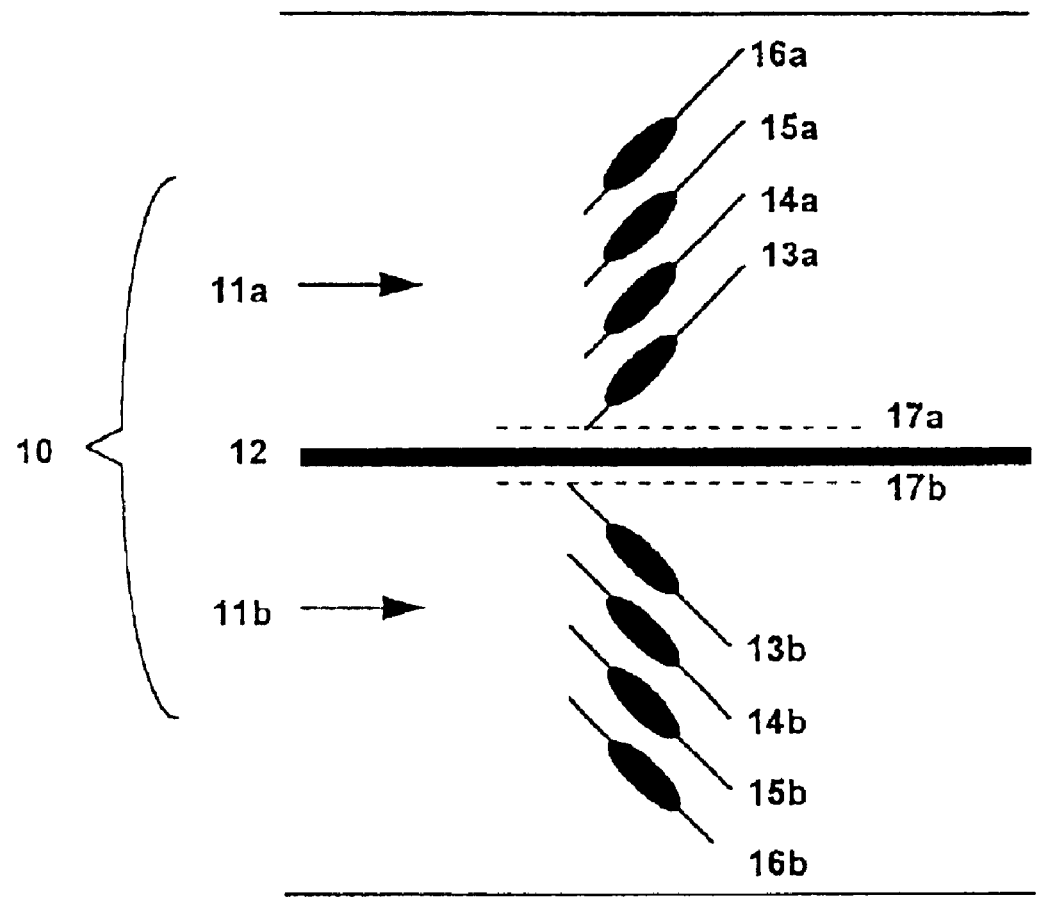

In the preferred embodiments as shown in FIGS. 1a to 1c, the angle ρ between lines 17a and 17b is substantially zero degrees. However, other values for the angle ρ that are different from zero degrees are also possible. In principle, the angle ρ can vary from 0 to 90 degrees. Preferably ρ is substantially 0 degrees or 90 degrees, most preferably 0 degrees.

In case the tilt angles $\theta_{min}$ and $\theta_{max}$ of the two layers are identical, that is $\theta_{min,\ a} = \theta_{min,\ b}$ and $\theta_{max,\ a} = \theta_{max,\ b}$, and the angle ρ is substantially zero degrees, the two layers have a structure which in the ideal case the ideal case shows mirror symmetry, with the interface or, if present, the substrate between the layers being a mirror plane, like depicted in FIGS. 1a and 1c.

Preferably the inventive optical retardation film exhibits a symmetrical structure wherein the interface or, if present, the substrate between the two layers is a mirror plane.

FIG. 1b represents an embodiment which is optically equivalent to the embodiment shown in FIG. 1a, but with the two layers being coated on two separate substrates.

Analoguously the corresponding optically equivalent to the embodiment shown in FIG. 1c can be obtained by combining two layers with constant tilt angle formed on two separate substrates.

The inventive optical retardation film does not necessarily have to comprise a substrate between the two layers of anisotropic polymer. In a preferred embodiment of the present invention, the two layers are directly adjacent to each other. Such an optical retardation film can be described in analogy to FIGS. 1a to 1c, wherein 12 and 12a respectively are indicating the interface between the two layers.

The retardation of the inventive optical retardation film is preferably ranging from 50 to 250 nm, very preferably from 60 to 200 nm, most preferably from 70 to 170 nm.

Another object of the present invention is a means to produce substantially linear polarized light, comprising an optical retardation film as described in the foregoing and the following in combination with a broadband circular reflective polarizer. When using this combination, light that is substantially linearly polarized can be produced.

The bandwidth of the wavelength band reflected by said broadband circular reflective polarizer is at least 100 nm, preferably at least 150 nm, most preferably at least 200 nm, ideally 250 nm or larger. Preferably the bandwidth of the circular reflective polarizer is covering the spectrum of visible light.

In another preferred embodiment of the present invention, the retardation of the optical retardation film is substantially 0.25 times a wavelength reflected by the broadband circular reflective polarizer, so that the optical retardation film serves as a quarter wave retardation film.

For a liquid crystal display comprising a broad band circular reflective polarizer and an optical retardation film of the state of the art, like e.g. a quarter wave film (QWF) made of stretched PVA, the luminance at normal incidence (viewing angle 0°) and at low values of the viewing angle is increased compared to a liquid crystal display comprising the circular reflective polarizer alone without an optical retardation film.

However, as the display comprising the a broad band circular reflective polarizer and a state of the art QWF as mentioned above is viewed under an increasing angle, the increasing phase retardation by the QWF itself causes a reduction to the luminance, coinciding with the value measured for the display comprising the circular reflective polarizer as a single component at a certain angle. This angle is referred to as the 'cross-over angle' $\alpha_c$.

When using an inventive optical retardation film instead of a state of the art QWF in the liquid crystal display, the cross-over angle $\alpha_c$ can be increased significantly. In other words, the brightness enhancement, i.e. the increase of luminance at low viewing angles, that was achieved by using the circular reflective polarizer can be extended also to large viewing angles.

The cross over angle $\alpha_c$ of a display comprising a combination of optical elements comprising an optical retardation film and a broadband circular reflective polarizer according to the present invention is preferably 25° or larger, particularly preferably 30° or larger, very particularly preferably 35° or larger in at least one direction of observation, e.g. in horizontal or vertical direction.

The means to produce substantially linear polarized light can comprise other optical elements in addition to the inventive optical retardation film and the circular reflective polarizer. Preferably said means additionally comprises at least one of the following elements:

I) a compensation film comprising a layer of an anisotropic polymer material with a homeotropic or tilted homeotropic orientation, said compensation film being positioned adjacent to either side of the inventive optical retardation film,
II) a linear polarizer, arranged in such a manner that the inventive optical retardation film and, if present, the compensation film I) are positioned between the broadband circular reflective polarizer and the linear polarizer,
III) a radiation source, and
IV) a diffusor adjacent to the radiation source, wherein the components I to IV are arranged in such a manner that the broadband circular reflective polarizer of the combination of optical elements is facing the radiation source III or, if present, the diffusor IV.

As a linear polarizer II a commercially available polarizer can be used. In a preferred embodiment of the present invention the linear polarizer is a low contrast polarizer. In another preferred embodiment of the present invention the linear polarizer II is a dichroic polarizer.

As a radiation source III preferably a standard backlight for liquid crystal displays, like e.g. a side-lit or a meander type backlight, is used. These backlights typically comprise a lamp, a reflector, a light guide and optionally a diffuser.

The radiation source III can also consist of a reflector that reflects radiation generated outside the means to produce substantially linear polarized light. The display device according to the present invention can then be used as a reflective display.

The means to produce substantially linear polarized light according to the present invention can further comprise V) one or more adhesive layers provided to at least one of the optical components comprising the circular reflective polarizer, the inventive optical retardation film or one of the components I to IV described above,
VI) one or more protective layers provided to at least one of the optical components comprising the circular reflective polarizer, the inventive optical retardation film or one of the components I to V described above.

Another object of the present invention is a liquid crystal display comprising a display cell and a means to produce substantially linear polarized light as described in the foregoing and the following.

Figure 2A:
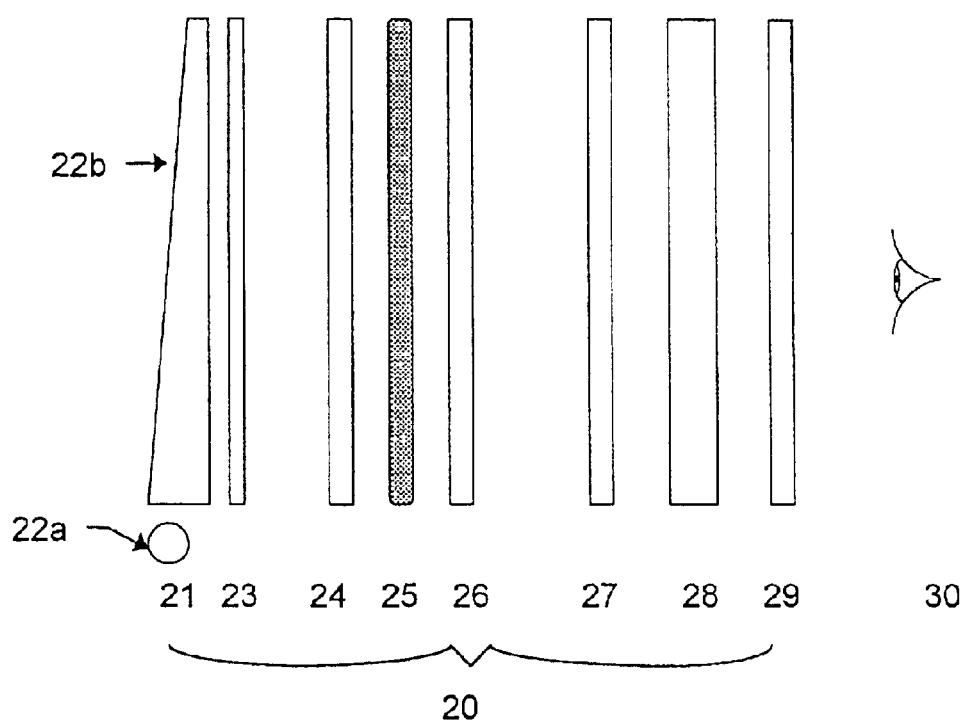
FIGS. 2a and 2b show a display device according to a preferred embodiment of the present invention.

The function of the inventive means to produce substantially linear polarized light is further explained by FIG. 2, which shows a display device according to a preferred embodiment of the present invention, as an example that should not limit the scope of the invention. The main direction of light following the optical path is from the left side to the right side. The display device 20 consists of a side-lit backlight unit 21 with a lamp 22a and a combined light guide and reflector 22b, a diffusor 23 and a polarizer combination consisting of a circular reflective polarizer 24 comprising a layer of a liquid crystalline material with a helically twisted molecular orientation, the inventive optical retardation film 25, a compensation film 26 and a linear polarizer 27. The figure further depicts a liquid crystal cell 28 and a second linear polarizer 29 behind the display cell.

Light emitted from the backlight 21 is interacting with the molecular helix structure of the circular reflective polarizer 24 with the result that 50% of the intensity of the light incident on the circular reflective polarizer is reflected as circular polarized light of the same twist sense as that of the molecular helix structure of the circular reflective polarizer, which may be either right-handed or left-handed, whereas the other 50% of the incident light are reflected as circular polarized light of the opposite twis sense. The reflected light is depolarized in the backlight and redirected by the reflector 22b onto the circular reflective polarizer 24. In this manner, theoretically 100% of the light of a broad range of wavelengths emitted from the backlight 21 are converted into circularly polarized light.

The main part of the transmitted component is converted by the inventive optical retardation film 25 into linear polarized light, which is then compensated by the compensation film 26 and being transmitted by the linear polarizer 27, whereas light which is not completely transferred into linear polarized light by the optical retardation film 25, such as elliptically polarized light, is not transmitted by the linear polarizer 27. The linear polarized light then passes through the display 28 and the second linear polarizer 29 to reach the viewer 30.

Figure 2B:
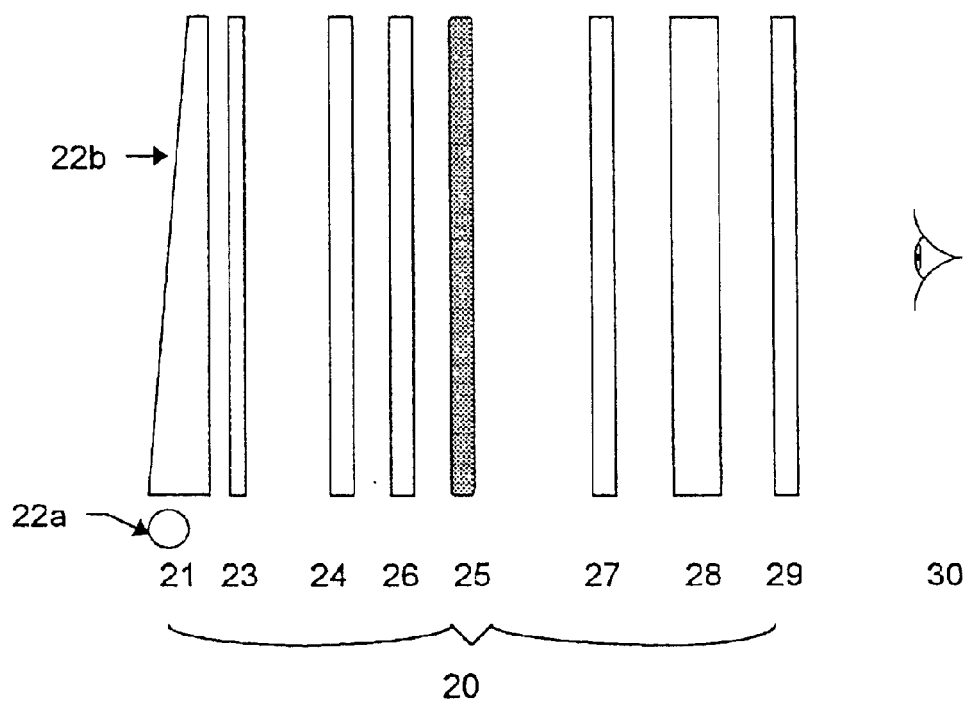

FIG. 2b depicts a display device according to another preferred embodiment of the invention having essentially the same assembly as that shown in FIG. 1a, with the difference that in the assembly shown in FIG. 2b the inventive optical retardation film 25 is placed behind the compensation film 26 when looking from the direction of incident light.

As mentioned above, it is also possible to use the inventive optical retardation film as a compensation film for conventional displays, like TN, STN, AMD-TN or other types of displays.

Thus, another object of the present invention is a liquid crystal display comprising a display cell and an optical retardation film as described in the foregoing and the following.

Preferably the optical retardation film is obtainable by a process comprising the following steps A) coating a mixture comprising
  a) a polymerizable mesogenic material comprising at least one polymerizable mesogen having at least one polymerizable functional group,
  b) an initiator, and
  c) optionally a solvent
  on a substrate or between a first and a second substrate in form of a layer,
B) aligning the polymerizable mesogenic material in the coated layer into a tilted and optionally a splayed structure.
C) polymerizing said mixture of a polymerizable mesogenic material by exposure to heat or actinic radiation,
D) optionally removing the substrate or, if two substrates are present, one or two of the substrates from the polymerized material, and
E) repeating the steps A), B), C) and optionally step D) at least one more time.

In a preferred embodiment of the present invention the steps A), B) and C) are carried out on both sides of a common substrate. In this way an optical retardation film as described in FIG. 1 is obtained.

As a substrate for example a glass or quarz sheet as well as a plastic film or sheet can be used. It is also possible to put a second substrate on top of the coated mixture prior to and/or during and/or after polymerization. The substrates can be removed after polymerization or not. When using two substrates in case of curing by actinic radiation, at least one substrate has to be transmissive for the actinic radiation used for the polymerization.

Isotropic or birefringent substrates can be used. In case the substrate is not removed from the polymerized film after polymerization, preferably isotropic substrates are used.

Preferably at least one substrate is a plastic substrate such as for example a film of polyester such as polyethyleneterephthalate (PET), of polyvinylalcohol (PVA), polycarbonate (PC) or triacetylcellulose (TAC), especially preferably a PET film or a TAC film. As a birefringent substrate for example an uniaxially stretched plastic film can be used. For example PET films are commercially available from ICI Corp. under the trade name Melinex.

The mixture comprising the polymerizable mesogenic material can additionally comprise a solvent. If the mixture contains a solvent, this is preferably evaporated after coating the mixture onto the substrate before polymerization. In most cases it is suitable to heat the mixture in order to facilitate the evaporation of the solvent.

In principal every solvent can be used that is known to the skilled in the art for this purpose. Preferably a solvent is used wherein the polymerizable mesogenic material dissolves easily. Typically an organic solvent, like e.g. toluene, is used.

In another preferred embodiment of the present invention as described above, each polymerized layer of the mesogenic material on the side facing the other layer or the substrate exhibits substantially planar alignment, i.e. the minimum tilt angle $\theta_{min}$ is substantially zero degrees. Planar alignment can be achieved for example by shearing the material, e.g. by means of a doctor blade. It is also possible to apply an alignment layer, for example a layer of rubbed polyimide or sputtered $SiO_x$, on top of at least one of the substrates.

An especially preferred embodiment of the present invention is characterized in that planar alignment of the polymerizable mesogenic material is achieved by directly rubbing the substrate, i.e. without applying an additional alignment layer. This is a considerable advantage as it allows a significant reduction of the production costs of the optical retardation film. In this way a low tilt angle can easily be achieved.

Preferably a plastic film, in particular a polyester film, e.g. Melinex, or a TAC film are used as a substrate in this preferred embodiment.

For example rubbing can be achieved by means of a rubbing cloth or with a flat bar coated with a rubbing cloth.

In another preferred embodiment of the present invention rubbing is achieved by means of a at least one rubbing roller, like e.g. a fast spinning roller that is brushing over the substrate, or by putting the substrate between at least two rollers, wherein in each case at least one of the rollers is optionally covered with a rubbing cloth.

In another preferred embodiment of the present invention rubbing is achieved by wrapping the substrate at least partially at a defined angle around a roller that is preferably coated with a rubbing cloth.

As rubbing cloth all materials can be used that are known to the skilled in the art for this purpose. For example velvet of a commercially available standard type can be used as a rubbing cloth.

Preferably rubbing is carried out only in one direction. Very preferably the rubbing direction on both sides of the substrate is the same.

A preferred embodiment of the present invention is characterized in that the two layers of the mesogenic material are adjacent to both sides of a common substrate, like e.g. depicted in FIG. 1a.

Such an optical retardation film, can be obtained for example by coating, aligning and polymerizing a mesogenic material on a substrate that has been rubbed unidirectionally on one side, and subsequently repeating the same process on the other side of the same substrate, wherein the substrate in the second process is rubbed in the same direction as in the first process.

Such an optical retardation film is advantageous compared to its optical equivalent, like for example shown in FIG. 1b, in that it is thinner and requires a lower amount of substrate.

An optical retardation film with a angle ρ different from 0 degrees as described above can be obtained if the rubbing directions on the two surfaces of the substrate are different from each other.

When using an anisotropic substrate, rubbing is preferably carried out unidirectionally in a direction substantially parallel to the major symmetry axis of the substrate.

The ability of the substrate to induce alignment in an inventive polymerizable mesogenic composition, which is coated on this substrate after rubbing the substrate, will depend on the process parameters of the rubbing process, like the rubbing length, the rubbing pressure and rubbing speed and, in case a rubbing roller is used, on the rotational velocity of the roller, the rubbing roller circumference and the tension on the substrate.

Thus, the rubbing length in the rubbing process according to the preferred embodiments described above is also depending on the other previously described process parameters of the rubbing process. Preferably the rubbing length is from 0.2 to 5 meters, in particular from 0.5 to 3 meters.

The orientation of the mesogenic material depends, inter alia, on the film thickness, the type of substrate, the alignment state of the substrate surface, and the composition of the polymerizable mesogenic material. Thus, by changing these parameters, it is possible to control the structure of the optical retardation film, and in particular the structure parameters like e.g. the tilt angle and its degree of variation.

When changing the composition of the polymerizable mesogenic mixture, for example by varying the ratio of direactive to monoreactive compounds and/or polar to unpolar compounds, the alignment profile in the direction perpendicular to the film plane can be altered.

In a preferred embodiment of the present invention the optical retardation film is obtained by a process as described above, wherein the substrate is removed from the polymerized mesogenic material after the first polymerization step. The second layer of polymerizable mesogenic material is then coated directly on the polymerized first layer, which acts as a substrate, and is then aligned and polymerized. In this way an optical retardation film is obtained that comprises two layers of polymerized mesogenic material that are directly adjacent to each other.

When preparing an optical retardation film according to this preferred embodiment, in some cases it is even not necessary to apply special alignment means or methods, since the first polymerized layer can act as aligning layer and can induce alignment in the second layer.

Polymerization of the inventive polymerizable mesogenic mixture takes place by exposing it to heat or to actinic radiation. Actinic radiation means irradiation with light, X-rays, gamma rays or irradiation with high energy particles, such as ions or electrons. In particular preferably UV light is used. The irradiation wavelength is preferably from 220 nm to 420 nm.

As a source for actinic radiation for example a single UV lamp or a set of UV lamps can be used. When using a high lamp power the curing time can be reduced.

The curing time is dependening, inter alia, on the reactivity of the polymerizable mesogenic material, the thickness of the coated layer, the type of polymerization initiator and the power of the UV lamp. For mass production short curing times are preferred. The curing time according to the invention is preferably not longer than 30 minutes, especially preferably not longer than 15 minutes and very particularly preferably shorter than 8 minutes.

The polymerization is carried out in the presence of an initiator absorbing the wavelength of the actinic radiation. For example, when polymerizing by means of UV light, a photoinitiator can be used that decomposes under UV irradiation to produce free radicals that start the polymerization reaction. As a photoinitiator for radicalic polymerization a commercially available photoinitiator like e.g. Irgacure 651 (by Ciba Geigy AG, Basel, Switzerland) can be used.

It is also possible to use a cationic photoinitiator, when curing polymerizable mesogens with for example vinyl and epoxide polymerizable groups, that photocures with cations instead of free radicals. The polymerization may also be started by an initiator that initiates the polymerization when heated above a certain temperature.

In addition to light- or temperature-sensitive initiators the polymerizable mixture may also comprise one or more other suitable components such as, for example, catalysts, stabilizers, co-reacting monomers or surface-active compounds.

In a preferred embodiment of the invention, the polymerizable mixture comprises a stabilizer that is used to prevent undesired spontaneous polymerization for example during storage of the mixture. As stabilizers in principal all compounds can be used that are known to the skilled in the art for this purpose. These compounds are commercially available in a broad variety. Typical examples for stabilizers are 4-ethoxyphenol or butylated hydroxytoluene (BHT).

The polymerizable mixture according to this preferred embodiment preferably comprises a stabilizer as described above at an amount of 1 to 1000 ppm, especially preferably 10 to 500 ppm.

Other additives, like e.g. chain transfer agents, can also be added to the polymerizable mixture in order to modify the physical properties of the inventive polymer film. For example when adding a chain transfer agent to the polymerizable mixture, the length of the free polymer chains and/or the length of the polymer chains between two crosslinks in the inventive polymer film can be controlled. When the amount of the chain transfer agent is increased, polymer films with decreasing polymer chain length are obtained.

In a preferred embodiment of the present invention the polymerizable mixture comprises 0.01 to 10%, in particular 0.1 to 5%, very preferably 0.5 to 3% of a chain transfer agent. The polymer films according to this preferred embodiment show especially good adhesion to a substrate, in particular to a plastic film, like e.g. a TAC film.

As a chain transfer agent for example monofunctional thiol compounds like e.g. dodecane thiol or multifunctional thiol compounds like e.g. trimethylpropane tri(3-mercaptopropionate) can be used.

In some cases it is of advantage to apply a second substrate to aid alignment and exclude oxygen that may inhibit the polymerization. Alternatively the curing can be carried out under an atmosphere of inert gas. However, curing in air is also possible using suitable photoinitiators and high UV lamp power. When using a cationic photoinitiator oxygen exclusion most often is not needed, but water should be excluded. In a preferred embodiment of the invention the polymerization of the polymerizable mesogenic material is carried out under an atmosphere of inert gas, preferably under a nitrogen atmosphere.

To obtain polymer films with good alignment the polymerization has to be carried out in the liquid crystal phase of the polymerizable mesogenic mixture. Preferably polymerizable mesogenic mixtures are used that have a low melting point, preferably a melting point of 100° C. or lower, in particular 60° C. or lower, so that curing can be carried out in the liquid crystalline phase of the mixture at low temperatures. This is simplifying the polymerization process as less heating of the mixture is required and there is less strain of the mesogenic materials, the substrates and the production equipment during polymerization, which is of importance especially for mass production. Curing temperatures below 100° C. are preferred. Especially preferred are curing temperatures below 60° C.

The thickness of the inventive optical retardation film obtained by the method as described above is preferably from 0.1 to 10 µm, in particular from 0.2 to 5 µm, most preferably from 0.4 to 2 µm. For some applications, a film thickness between 2 and 15 µm is also suitable.

In a preferred embodiment of the present invention, the broadband circular reflective polarizer and/or the compensation film of the inventive means to produce linear polarized light are comprising a layer of an anisotropic polymer material that is obtained by polymerizing an oriented layer of polymerizable mesogens.

Particularly preferably these polymerizable mesogens have a structure which is similar to that of the polymerizable mesogenic compounds of formula I as described above and below.

Thus, when using an inventive optical retardation film together with a broadband circular reflective polarizer and/or a compensation film according to this preferred embodiment, it is possible to adapt the optical properties of the optical retardation film to those of the circular reflective polarizer and/or the compensation film by using materials comprising compounds with similar structure. In this way a combination of an optical retardation film and a circular reflective polarizer and/or a compensation film with superior optical performance can be obtained.

In a preferred embodiment the polymerizable mixture comprises polymerizable mesogenic compounds having two or more polymerizable functional groups (referred to as di-/multireactive or di-/multifunctional compounds). Upon polymerization of such a mixture a three-dimensional polymer network is formed. An optical retardation film made of such a network is self-supporting and shows a high mechanical and thermal stability and a low temperature dependence of its physical and optical properties.

In another preferred embodiment the polymerizable mixture comprises 0 to 20% of a non mesogenic compound with two or more polymerizable functional groups to increase crosslinking of the polymer. Typical examples for difunctional non mesogenic monomers are alkyldiacrylates or alkyldimethacrylates with alkyl groups of 1 to 20 C atoms. Typical examples for non mesogenic monomers with more than two polymerizable groups are trimethylpropanetrimethacrylate or pentaerythritoltetraacrylate.

By varying the concentration of the multifunctional mesogenic or non mesogenic compounds the crosslink density of the polymer film and thereby its physical and chemical properties such as the glass transition temperature, which is also important for the temperature dependence of the optical properties of the optical retardation film, the thermal and mechanical stability or the solvent resistance can be tuned easily.

The terms polymerizable or reactive mesogen, polymerizable or reactive mesogenic compound, polymerizable or reactive liquid crystal (compound) and polymerizable or reactive liquid crystalline compound as used in the foregoing and the following comprise compounds with a rodlike, boardlike or disklike mesogenic group and at least one polymerizable functional group. These mesogenic compounds do not necessarily have to exhibit mesophase behaviour by themselves. It is also possible that they show mesophase behaviour in mixtures with other compounds or after polymerization of the pure mesogenic compounds or of the mixtures comprising the mesogenic compounds.

In a particularly preferred embodiment of the present invention, the polymerizable mesogens comprised by the mixture of the polymerizable mesogenic material are compounds of formula I $$P\text{-}(Sp\text{-}X)_n\text{-}MG\text{-}R \qquad \text{I}$$

wherein
P is a polymerizable group,
Sp is a spacer group having 1 to 20 C atoms,
X is a group selected from —O—, —S—, —CO—, —COO—, —OCO—, —OCOO— or a single bond,
n is 0 or 1,
MG is a mesogenic or mesogenity supporting group, preferably selected according to formula II $$-(A^1\text{-}Z^1)_m\text{-}A^2\text{-}Z^2\text{-}A^3\text{-} \qquad \text{II}$$

wherein
$A^1$, $A^2$ and $A^3$ are independently from each other 1,4-phenylene in which, in addition, one or more CH groups may be replaced by N, 1,4-cyclohexylene in which, in addition, one or two non-adjacent $CH_2$ groups may be replaced by O and/or S, 1,4-cyclohexenylene or naphthalene-2,6-diyl, it being possible for all these groups to be unsubstituted, mono- or polysubstituted with halogen, cyano or nitro groups or alkyl, alkoxy or alkanoyl groups having 1 to 7 C atoms wherein one or more H atoms may be substituted by F or Cl,
$Z^1$ and $Z^2$ are each independently —COO—, —OCO—, —$CH_2CH_2$—, —$OCH_2$—, —$CH_2O$—, —CH=CH—, —C≡C—, —CH=CH—COO—, —OCO—CH=CH— or a single bond and
m is 0, 1 or 2, and
R is an alkyl radical with up to 25 C atoms which may be unsubstituted, mono- or polysubstituted by halogen or CN, it being also possible for one or more non-adjacent $CH_2$ groups to be replaced, in each case independently from one another, by —O—, —S—, —NH—, —N($CH_3$)—, —CO—, —COO— —OCO—, —OCO—O—, —S—CO—, —CO—S— or —C≡C— in such a manner that oxygen atoms are not linked directly to one another, or alternatively R is halogen, cyano or has independently one of the meanings given for P-(Sp-X)$_n$—.

Particularly preferred are polymerizable mixtures comprising at least two polymerizable mesogenic compounds at least one of which is a compound of formula I.

In another preferred embodiment of the invention the polymerizable mesogenic compounds are selected according to formula I, wherein R has one of the meanings of P-(Sp-X)$_n$— as given above.

Bicyclic and tricyclic mesogenic compounds are preferred.

Of the compounds of formula I especially preferred are those in which R is F, Cl, cyano, or optionally halogenated alkyl or alkoxy, or has the meaning given for P-(Sp-X)$_n$-, and MG is of formula II wherein $Z^1$ and $Z^2$ are —COO—, —OCO—, —$CH_2$—$CH_2$—, —CH=CH—COO—, —OCO—CH=CH— or a single bond.

A smaller group of preferred mesogenic groups of formula II is listed below. For reasons of simplicity, Phe in these groups is 1,4-phenylene, Phe L is a 1,4-phenylene group which is substituted by at least one group L, with L being F, Cl, CN or an optionally fluorinated alkyl, alkoxy or alkanoyl group with 1 to 4 C atoms, and Cyc is 1,4-cyclohexylene.

| | |
|---|---|
| -Phe-$Z^2$-Phe- | II-1 |
| -Phe-$Z^2$-Cyc- | II-2 |
| -PheL-$Z^2$-Phe- | II-3 |
| -PheL-$Z^2$-Cyc- | II-4 |
| -Phe-$Z^2$-PheL- | II-5 |
| -Phe-$Z^1$-Phe-Phe- | II-6 |
| -Phe-$Z^1$-Phe-Cyc- | II-7 |
| -Phe-$Z^1$-Phe-$Z^2$-Phe- | II-8 |
| -Phe-$Z^1$-Phe-$Z^2$-Cyc- | II-9 |
| -Phe-$Z^1$-Cyc-$Z^2$-Phe- | II-10 |
| -Phe-$Z^1$-Cyc-$Z^2$-Cyc- | II-11 |
| -Phe-$Z^1$-PheL-$Z^2$-Phe- | II-12 |
| -Phe-$Z^1$-PheL-$Z^2$-PheL- | II-13 |
| -PheL-$Z^1$-Phe-$Z^2$-PheL- | II-14 |
| -PheL-$Z^1$-PheL-$Z^2$-Phe- | II-15 |
| -PheL-$Z^1$-PheL-$Z^2$-PheL- | II-16 |

In these preferred groups $Z^1$ and $Z^2$ have the meaning given in formula I described above. Preferably $Z^1$ and $Z^2$ are —COO—, —OCO—, —$CH_2CH_2$—, —CH=CH—COO— or a single bond.

L is preferably F, Cl, CN, $NO_2$, $CH_3$, $C_2H_5$, $OCH_3$, $OC_2H_5$, $COCH_3$, $COC_2H_5$, $CF_3$, $OCF_3$, $OCHF_2$, $OC_2F_5$, in particular F, Cl, CN, $CH_3$, $C_2H_5$, $OCH_3$, $COCH_3$ and $OCF_3$, most preferably F, $CH_3$, $OCH_3$ and $COCH_3$.

Particularly preferred are compounds wherein MG is selected from the following formulae

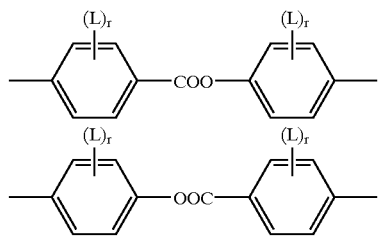

-continued

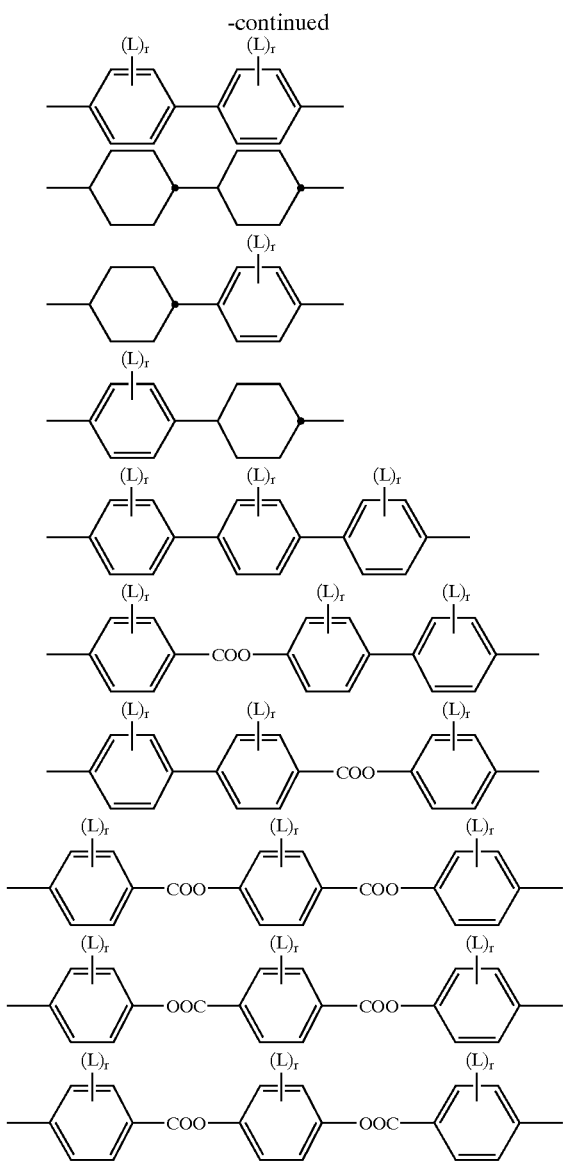

wherein L has the meaning given above and r is 0, 1 or 2.

The group

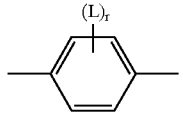

in this preferred formulae is very preferably denoting

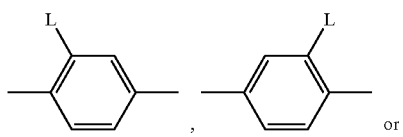

-continued

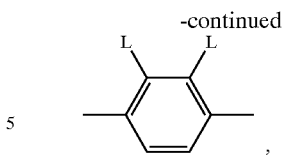

furthermore

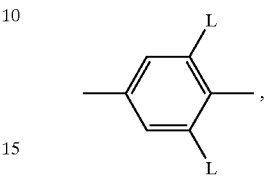

with L having each independently one of the meanings given above.

R in these preferred compounds is particularly preferably CN, F, Cl, OCF$_3$, or an alkyl or alkoxy group with 1 to 12 C atoms or has one of the meanings given for P-(Sp-X)$_n$—.

If R in formula I is an alkyl or alkoxy radical, i.e. where the terminal CH$_2$ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, methoxy, nonoxy, decoxy, undecoxy, dodecoxy, tridecoxy or tetradecoxy, for example.

Oxaalkyl, i.e. where one CH$_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-,7-, 8- or 9-oxadecyl, for example.

In addition, mesogenic compounds of the formula I containing a branched group R can be of importance as comonomers, for example, as they reduce the tendency towards crystallization. Branched groups of this type generally do not contain more than one chain branch. Preferred branched groups are isopropyl, isobutyl (=methylpropyl), isopentyl (=3-methylbutyl), isopropoxy, 2-methylpropoxy and 3-methylbutoxy.

P in formula I is preferably selected form CH$_2$=CW—COO—, WCH=CH—O—,

or CH$_2$=CH-Phenyl-(O)$_k$— with W being H, CH$_3$ or Cl and k being 0 or 1,

P is particularly preferably a vinyl group, an acrylate group, a methacrylate group, a propenyl ether group or an epoxy group, very particularly preferably an acrylate or methacrylate group.

As for the spacer group Sp in formula I, IIa and Ib all groups can be used that are known for this purpose to the skilled in the art. The spacer group Sp is preferably linked to the polymerizable group P by an ester or ether group or a single bond. The spacer group Sp is preferably a linear or branched alkylene group having 1 to 20 C atoms, in particular 1 to 12 C atoms, in which, in addition, one or more non-adjacent CH$_2$ groups may be replaced by —O—, —S—, —NH—, —N(CH$_3$)—, —CO—, —O——CO—, —S—CO—, —O—COO—, —CO—S—, —CO—O—, —CH(halogen)—, —CH(CN)—, —CH=CH— or —C≡C—.

Typical spacer groups Sp are for example —(CH$_2$)$_o$—, —(CH$_2$CH$_2$O)$_r$—CH$_2$CH$_2$—, —CH$_2$CH$_2$—S—CH$_2$CH$_2$— or —CH$_2$CH$_2$—NH—CH$_2$CH$_2$—, with o being an integer from 2 to 12 and r being an integer from 1 to 3.

Preferred spacer groups Sp are ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyl-iminoethylene and 1-methylalkylene, for example.

In the event that R is a group of formula P-Sp-X— or P-Sp- respectively, the spacer groups on each side of the mesogenic core may be identical or different.

In particular preferred are compounds of formula I wherein n is 1.

In another preferred embodiment, the inventive compensator is obtained by copolymerizing mixtures comprising compounds of formula I wherein n is 0 and compounds of formula I wherein n is 1.

Typical examples representing polymerizable mesogenic compounds of the formula I can be found in WO 93/22397; EP 0 261 712; DE 195 04 224; DE 44 08 171 or DE 44 05 316. The compounds disclosed in these documents, however are to be regarded merely as examples that should not limit the scope of this invention.

Furthermore, typical examples representing polymerizable mesogenic compounds are shown in the following list of compounds, which is, however, to be understood only as illustrative without limiting the scope of the present invention:

independently H, F, Cl, CN, or an optionally halogenated alkyl, alkoxy or alkanoyl group with 1 to 7 C atoms.

The polymerizable mesogenic compounds disclosed in the foregoing and the following can be prepared by methods which are known per se and which are described in the documents cited above and, for example, in standard works of organic chemistry such as, for example, Houben-Weyl, Methoden der organischen Chemie, Thieme-Verlag, Stuttgart.

As mentioned above, the properties of an inventive optical retardation film, like e.g. mesogen orientation and film structure, temperature stability and optical performance, can easily be adjusted to the desired specification by varying the composition of the polymerizable mesogenic material.

One possible way to adjust the alignment profile in the direction perpendicular to the film plane is the appropriate selection of the ratio of monoreactive mesogenic compounds, i.e. compounds with one polymerizable group, and direactive mesogenic compounds, i.e.—compounds with two polymerizable groups.

For a highly splayed film structure, preferably the ratio of mono- to direactive mesogenic compounds should be in the range of 6:1 to 1:2, preferably 3:1 to 1:1, especially preferably about 3:2.

Another effective means to adjust the desired splay geometry is to use a defined amount of dielectrically polar reactive mesogens in the polymerizable mesogenic mixture. These polar reactive mesogens can be either monoreactive or direactive. They can be either dielectrically positive or negative. Most preferred are dielectrically positive and monoreactive mesogenic compounds.

The amount of the polar compounds in the polymerizable mesogenic mixture is preferably 1 to 80%, especially 3 to 60%, in particular 5 to 40% by weight of the total mixture.

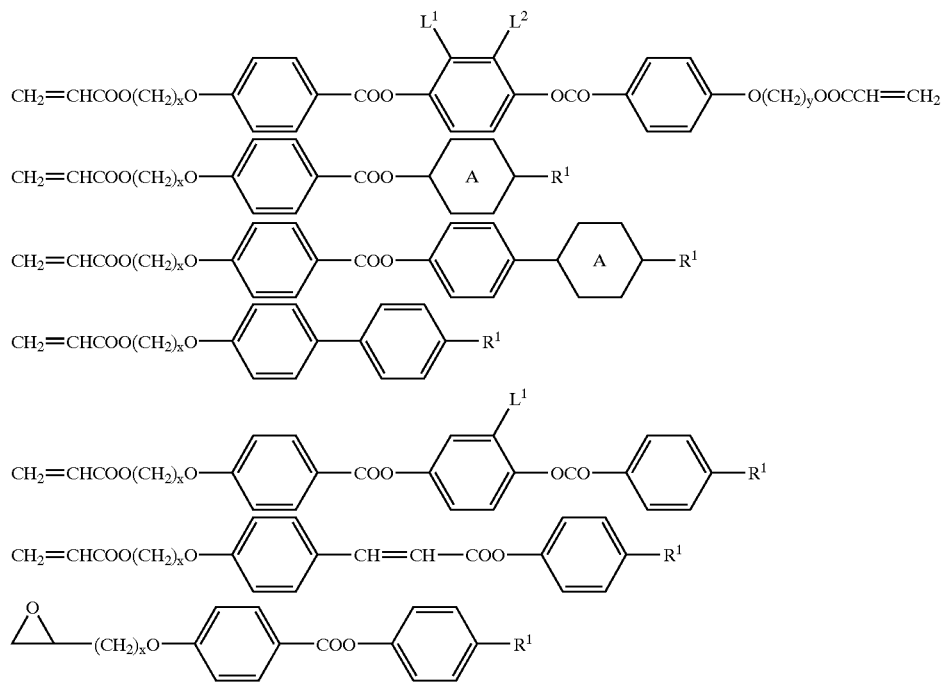

In these compounds x and y are each independently 1 to 12, A is a 1,4-phenylene or 1,4-cyclohexylene group, $R^1$ is halogen, cyano or an optionally halogenated alkyl or alkoxy group with 1 to 12 C atoms and $L^1$ and $L^2$ are each Polar compounds bear one or more polar groups. Preferably these groups are selected from terminal or lateral end groups like CN, F, Cl, OCF$_3$, OCF$_2$H, OC$_2$F$_5$, CF$_3$, OCN or SCN, or from bridge groups like —COO—, —OCO—, —O—, —S—, —OCH$_2$—, —CH$_2$O—, —OCOO—, —COO—CH=CH— or —CF$_2$=CF$_2$—. Very preferably these groups are selected from CN, F, Cl and OCF$_3$.

Furthermore, these polar compounds preferably have a high absolute value of the dielectric anisotropy Δ∈, which is typically higher than 1.5. Thus, dielectrically positive compounds preferably exhibit Δ∈>1.5 and dielectrically negative polar compounds preferably exhibit Δ∈<-1.5. Very preferred are dielectrically positive polar compounds with Δ∈>3, in particular with Δ∈>5.

In a preferred embodiment of the present invention, the optical retardation film is obtainable from a mixture of a polymerizable mesogenic material comprising the following components a1) 10 to 99% by weight of at least one mesogen according to formula I having one polymerizable functional group, a2) 0 to 70% by weight of at least one mesogen according to formula I having two or more polymerizable functional groups, b) 0.01 to 5% by weight of an initiator, Mixtures according to this preferred embodiment are preferred that comprise a1A) 10 to 65%, preferably 15 to 50% by weight of at least one polymerizable mesogen of formula I having one polymerizable group, wherein R is an alkyl or alkoxy group with 1 to 12 C atoms, a1B) 5 to 40%, preferably 8 to 30% by weight of at least one polymerizable mesogen of formula I having one polymerizable group, wherein R is CN, F, Cl or a halogenated alkyl or alkoxy group with 1 to 12 C atoms, a2) 2 to 90%, preferably 5 to 60% by weight of at least one polymerizable mesogen of formula I having two polymerizable groups, wherein R has one of the meanings of P-(Sp-X—)$_n$.

b) 0.01 to 5% by weight of an initiator.

Very preferred are mixtures according to this particularly preferred embodiment wherein the ratio of components a1A to a1B to a2 is in the range of 2:1:2.

Further preferred are mixtures according to this particularly preferred embodiment that comprise two to eight, in particular two to six, most preferably two to four different polymerizable mesogens of components a1A and a1B.

In the mixtures comprising two or more different mesogens according to formula I having one polymerizable functional group as described above, preferably each of the different mesogens according to formula I is different in at least one of the groups P, Sp, X, A$^1$, A$^2$, A$^3$, Z$^1$, Z$^2$ and R from each other of the mesogens.

Furthermore, it has been found that when using monoreactive unpolar compounds, like e.g. compounds of formula Ia

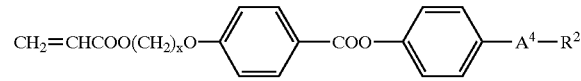

Ia wherein x is 1 to 12, R$^2$ is C$_{1-12}$ alkyl or alkoxy, and
A$^4$ is denoting 1,4-phenylene, trans-1,4-cyclohexylene or a single bond, preferably 1,4-cyclohexylene, in a defined amount, the alignment profile and the tilt angle of the inventive optical retardation film can easily be adjusted to the desired specification.

For example, when preparing an optical retardation film as described above from a polymerizable mesogenic mixture comprising monoreactive unpolar compounds, e.g. compounds of formula Ia, together with direactive compounds and dielectrically positive polar monoreactive compounds of formula I, the tilt angle of the film is increasing with increasing amount of the monoreactive unpolar compounds.

In a preferred embodiment of the present invention, the polymerizable mesogenic mixture comprises 2 to 30%, preferably 5 to 25% by weight of compounds of formula Ia.

In another preferred embodiment, the polymerizable mesogenic mixture comprises 15 to 60%, preferably 20 to 55% by weight of compounds of formula Ia.

In another preferred embodiment, the polymerizable mesogenic mixture comprises 45 to 90%, preferably 50 to 85% by weight of compounds of formula Ia.

Without further elaboration one skilled in the art can, using the preceding description, utilize the present invention to its fullest extent. The following examples are, therefore, to be construed as merely illustrative and not limitative of the remainder of the disclosure in any way whatsoever.

EXAMPLES

In the foregoing and in the following examples, unless otherwise indicated, all temperatures are set forth uncorrected in degrees Celsius and all parts and percentages are by weight. The following abbreviations are used to illustrate the liquid crystalline phase behaviour of the compounds:

K=crystalline; N=nematic; S=smectic; Ch=cholesteric; I=isotropic. The numbers between these symbols indicate the phase transition temperatures in degree Celsius.

Example 1

The following polymerizable mixture was formulated compound (1) 38.9%
compound (2) 38.9%
compound (3) 19.2%
Irgacure 907 3.0%

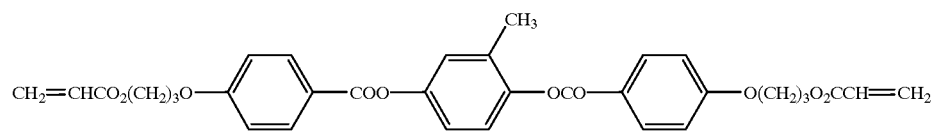

(1)

-continued

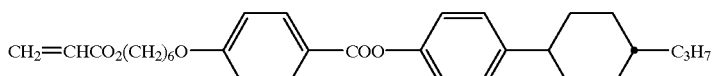

(2)

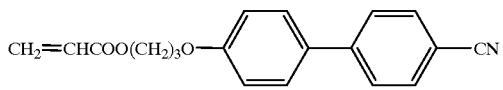

(3)

Irgacure 907 is a commercially available photoinitiator (Ciba Geigy AG) of the following formula

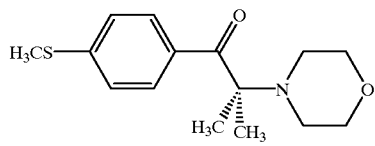

In order to prepare an optical retardation film, a solution of 12% by weight of the above given polymerizable mixture in toluene is coated onto a TAC film (Lonza triphan type 91) that has been rubbed with a velvet coated bar unidirectionally at a length of 500 mm. The thickness of the coated solution is 6 μm. The toluene is evaporated to give a 0.7 μm thick layer of the above given polymerizable mixture. The layer is then polymerized by irradiation with UV light of 254 nm with an irradiance of 1500 mW/cm².

The rubbing, coating and curing process is then repeated on the other side of the TAC film, wherein the rubbing of the TAC substrate is carried out in the same direction as in the first step. A polymer film is obtained that can be used as an optical retardation film.

Use Example A

The retardation of the optical retardation film of example 1 was measured using an Olympus BX-50 polarizing microscope equipped with a quartz Berek type compensator and a tilting (−60° to +60°) and rotating (0 to 360°) stage.

The retardation of the optical retardation film of example 1 is 100 nm, measured at a wavelength of 550 nm and normal incidence.

To compare the performance of the inventive optical retardation film with retardation films of prior art, the measurement described above was repeated with the following retardation films:
1) a retardation film consisting of stretched polyvinylalcohol (PVA) available from Polatechno (17140 T),
2) a retardation film consisting of stretched polycarbonate (PC),
3) a retardation film consisting of a polymerized mesogenic material with planar alignment, comprising compounds similar to those of formula I of the present invention.

The measurement was carried out at different wavelengths of incident light and with the viewing angle varying in directions parallel and perpendicular to the major optical axis of the retardation film, which corresponds to the direction of orientation of the polymerized mesogenic material or, in case of the stretched PVA and PC films, the stretch direction.

Figure 3A:
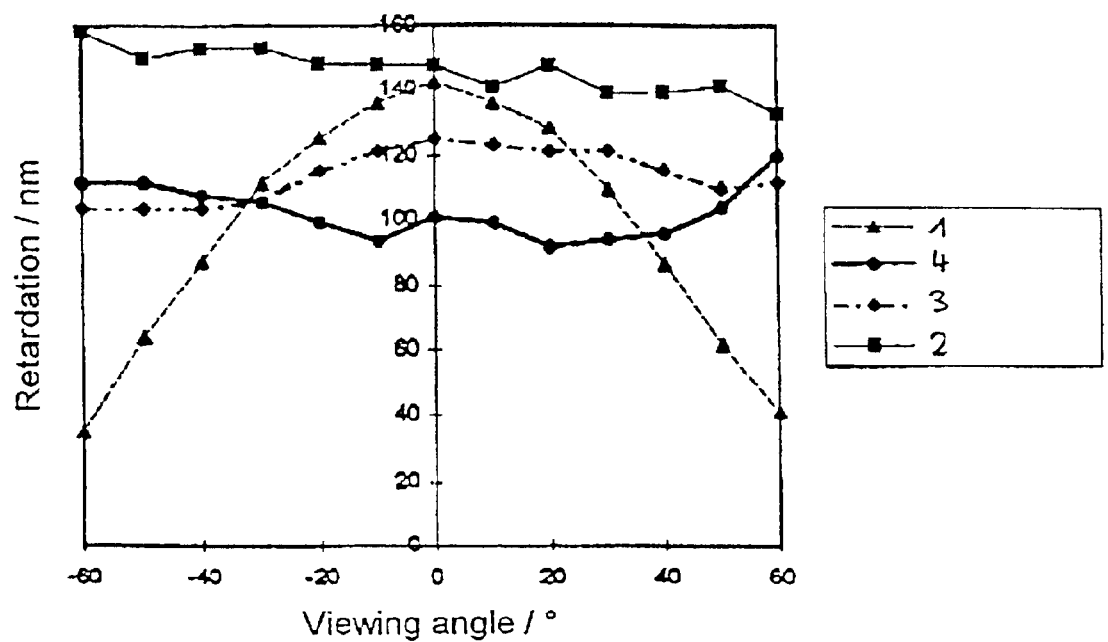
FIGS. 3a and 3b show the retardation versus viewing angle of an inventive optical retardation film compared to optical retardation films of the state of the art, measured in two directions of observation.

FIG. 3a shows the retardation versus viewing angle at a wavelength of 550 nm for the optical retardation film of example 1 (curve 4), a PVA film (1), a PC film (2) and a film consisting of polymerized mesogenic material with planar alignment (3), wherein the direction of observation is parallel to the major optical axis of the films.

Figure 3B:
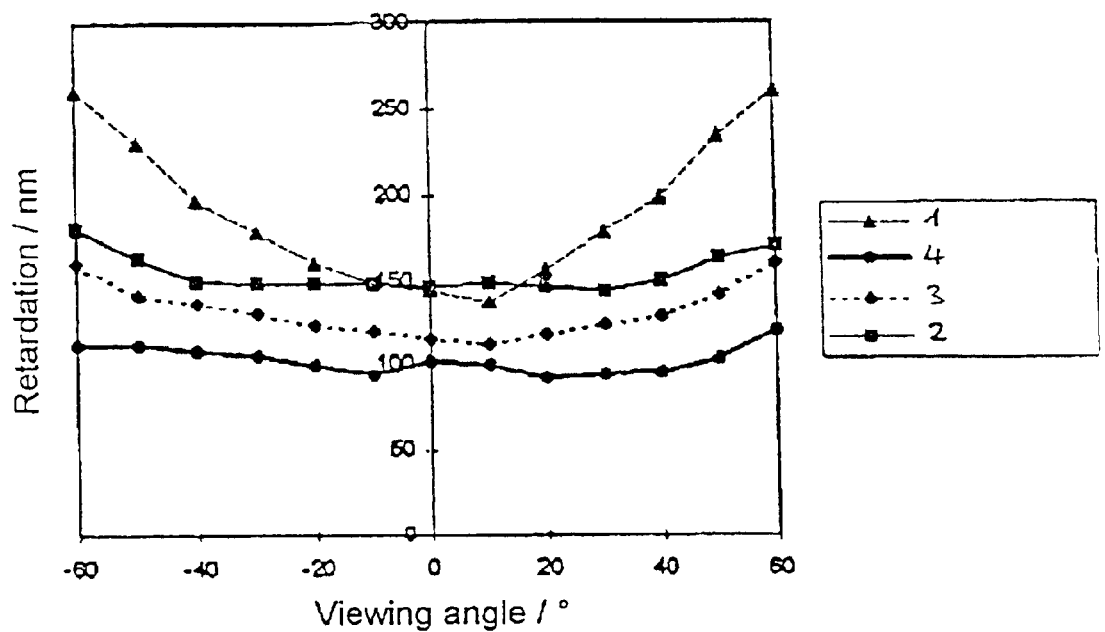

FIG. 3b shows the retardation versus viewing angle at a wavelength of 550 nm for the optical retardation film of example 1 (curve 4), a PVA film (1), a PC film (2) and a film consisting of polymerized mesogenic material with planar alignment (3), wherein the direction of observation is perpendicular to the major optical axis of the films.

The inventive optical retardation film exhibits a retardation with a significantly low viewing angle dependence, in particular when compared to a stretched PVA film.

Figure 4:
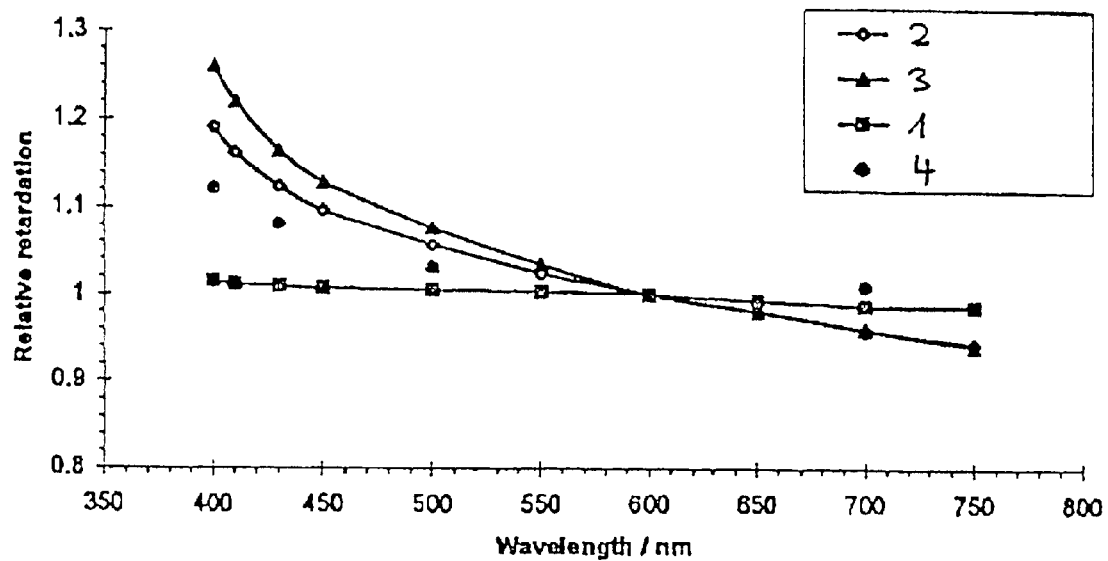
FIG. 4 shows the normalized retardation versus wavelength for an inventive optical retardation film compared to optical retardation films of the state of the art.

FIG. 4 shows the normalized retardation versus wavelength of an inventive optical retardation film (curve 4) compared the state of the art optical retardation films 1, 2 and 3 mentioned above (curve 1 to 3).

From FIG. 4 it can be seen that the wavelength dependence of the retardation of an inventive optical retardation film is very low and is second only to the PVA film, which, however, shows an unfavourable viewing angle dependence, as depicted in FIGS. 3a/b.

Thus, when taking the combination of wavelength dependence and viewing angle dependence of the retardation, the inventive optical retardation film shows superior behaviour compared to state of the art optical retardation films. Such a film is therefore suitable for the use in a liquid crystal display device.

Example 2

The following polymerizable mixture was formulated
compound(1) 38.4%
compound (2) 38.4%
compound (4) 19.2%
Irgacure 907 4.0%

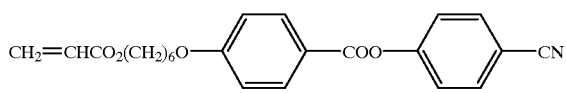

(4)

An optical retardation film is prepared from a solution of 20% by weight of the above given polymerizable mixture in toluene as described in example 1.

Use Example B

Figure 5:
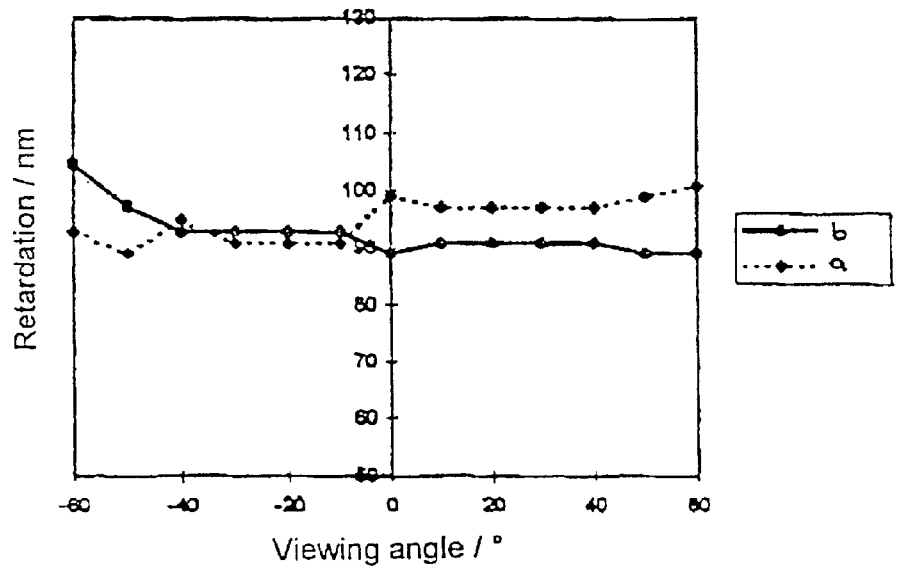
FIG. 5 shows the retardation versus viewing angle of an inventive optical retardation film, measured in two directions of observation.

The retardation of the optical retardation film of example 1 was measured as described in example A. The results are depicted in FIG. 5, that shows the retardation versus viewing angle at a wavelength of 550 nm, with the direction of observation being parallel (curve a) and perpendicular (curve b) to the major optical axis of the film. For a wavelength of 550 nm and normal incidence the retardation is 100 nm.

The optical performance of the inventive retardation film was determined when used together with a broad band cholesteric circular reflective polarizer that is consisting of a polymerized mixture comprising chiral and achiral reactive mesogenic compounds. The reflective polarizer exhibits a cholesteric structure with planar orientation and multiple pitch lengths of the cholesteric helix, and has a broad wavelength reflection band with a bandwidth of 300 nm.

The luminance of light from a commercial LCD backlight passing through an assembly with the circular reflective polarizer and the inventive optical retardation film of example 2 was measured using a Minolta CS-100 colour camera at a range of viewing angles (−60° to +60°). The experiment was repeated with a similar assembly, wherein the inventive optical quarter wave retardation film was replaced by one of the state of the art retardation films 1, 2 and 3 described in example A.

Figure 6A:
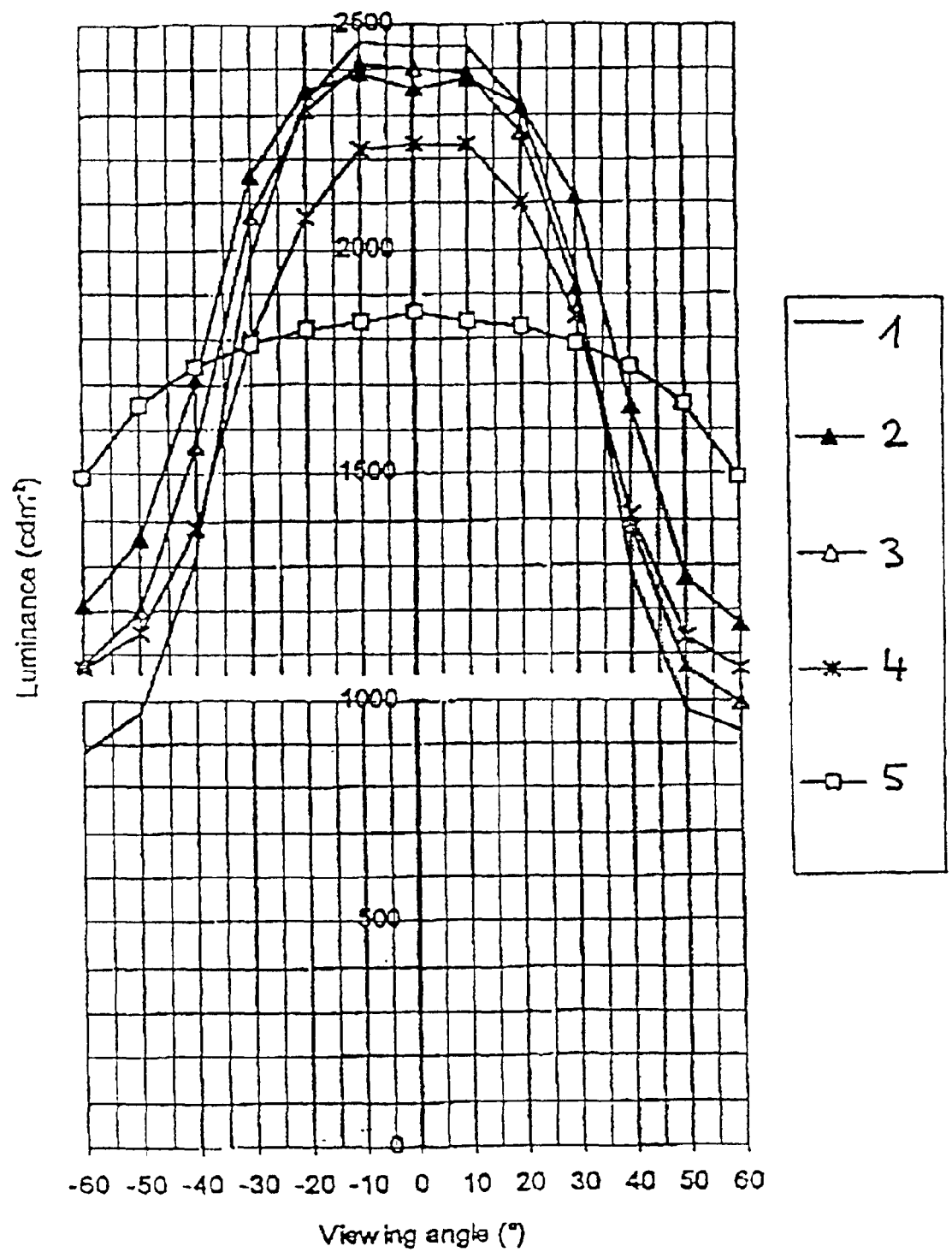
FIGS. 6a and 6b show the luminance versus viewing angle for an inventive combination of a broad waveband circular reflective polarizer and an inventive optical retardation film, compared to a combination of a broad waveband circular reflective polarizer and different optical retardation films of the state of the art.
Figure 6B:
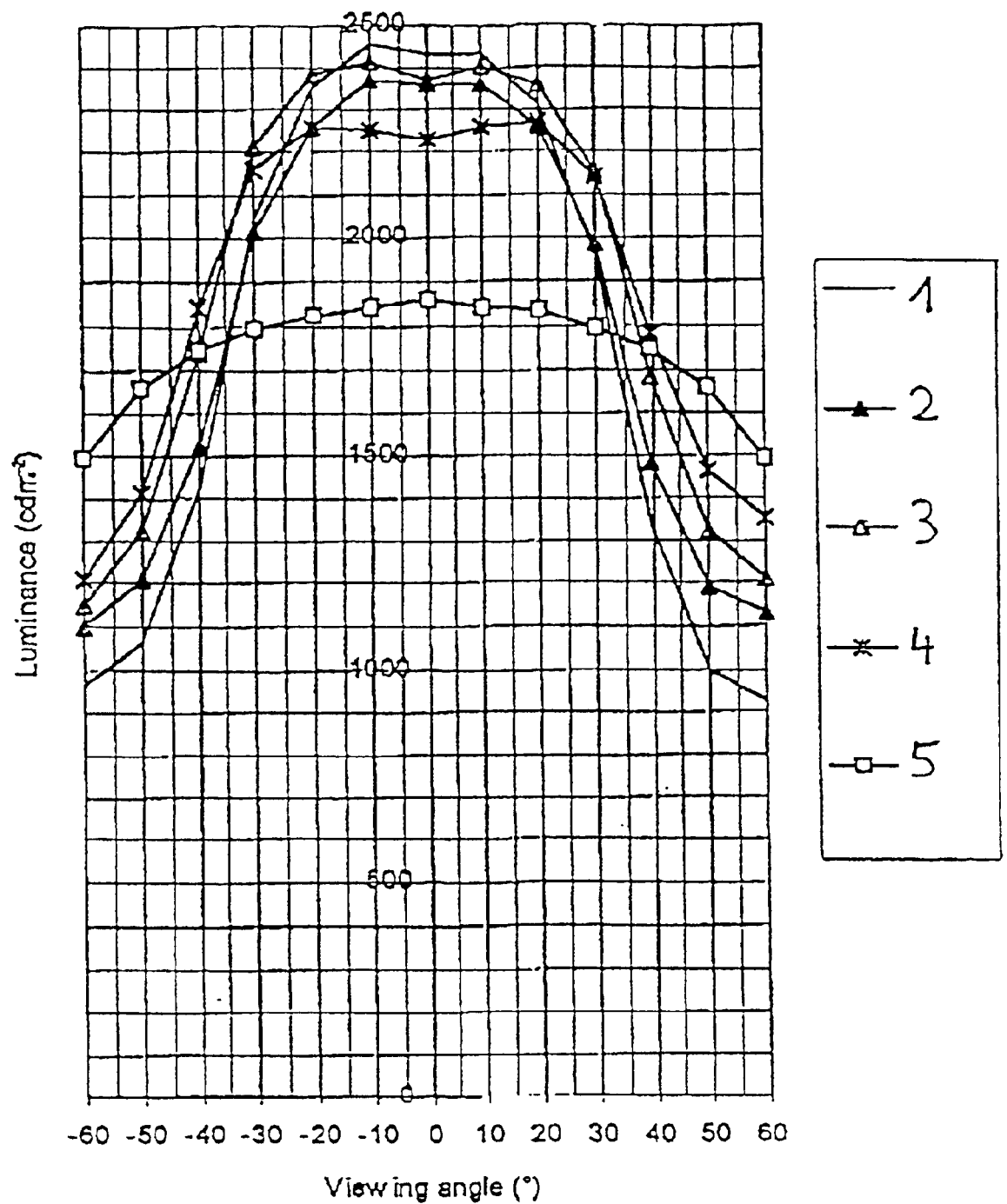

FIGS. 6a and 6b depict the measurement results for observation parallel (6a) and perpendicular (6b) to the major optical axis of the films.

Curve 5 in FIGS. 6a/b depicts the luminance of the LCD backlight and the circular reflective polarizer alone. Curves 1 to 4 show the luminance of the LCD backlight and a combination of the circular reflective polarizer together with the inventive optical retardation film (curve 4) or one of the state of the art retardation films 1 to 3 (curve 1 to 3, each corresponding to the film with the same number).

When viewing in a direction parallel to the major optical axis of the films, the luminance of an inventive assembly comprising the inventive optical retardation film of example 2 is slightly lower than that of the assembly comprising the state of the art films 1 to 3.

However, when viewing in a direction perpendicular to the major optical axis of the films, the luminance of an inventive assembly comprising the inventive optical retardation film of example 2 is slightly lower than that of the assembly comprising the state of the art films 1 to 3 for small viewing angles, but higher for viewing angles larger than 30 degrees. The cross-over angle ac for an inventive assembly is increased.

The optical retardation film and the broadband circular reflective polarizer in FIGS. 6a/b according to example B are not optically coupled. If they are laminated together, or if the circular reflective polarizer is prepared by polymerization of a mixture of reactive cholesteric mesogenic compounds using the optical retardation film as a substrate, the cross over angle ac can be further increased.

The results of experiments according to example A and B clearly demonstrate the improved properties of an inventive optical retardation film compared to an optical retardation film of the state of the art, especially when used in combination with a broadband cholesteric circular reflective polarizer.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Polymer layers comprising an anisotropic polymer layer exhibiting a tilted structure with an optical axis having a tilt angle θ relative to the plane of the layer greater than zero, obtained by polymerizing a polymerizable mesogenic material comprising at least one compound of the formula:

$$P\text{-}(Sp\text{-}X)_n\text{-}MG\text{-}R \qquad \qquad I$$

wherein

P is a polymenzable group,

Sp is a spacer group having 1 to 20 C atoms,

X is a group of —O—, —S—, —CO—, —COO—, —OCO—, —OCOO— or a single bond, n is 0 or 1, MG is a mesogenic or mesogenicity supporting group, and R is an alkyl radical with up to 25 C atoms optionally unsubstituted, mono- or polysubstituted by halogen or CN, optionally one or more non-adjacent CH$_2$ groups are replaced, independently, by —O—, —S—, —NH—, —N(CH$_3$)—, —CO—, —COO—, —OCO—, —OCO—O—, —S—CO—, —CO—S— or —C≡C— where oxygen atoms are not linked directly to one another, or R is halogen, cyano or, independently, P-(Sp-X)$_n$— as defined in formula I, wherein the polymerizable mesogenic material comprises at least 95% by weight of polymerizable compounds, and the tilt angle θ in each of said layers varies continuously in a direction normal to the layer, starting from a minimum value θ$_{min}$ of 0–20 degrees the side of the layer facing the other layer or, if present, the common substrate, and ranging to a maximum value θ$_{max}$ of 20–90 degrees on the opposite side of the layer.

2. Polymer layers according to claim 1, wherein the polymerizable mesogenic material is a mixture of:

a1A) 10 to 65%, by weight of at least one compound of formula I having one polymerizable group, wherein R is an alkyl or alkoxy group with 1 to 12 C atoms;

a1B) 5 to 40% by weight of at least one compound of formula I having one polymerizable group, wherein R is CN, F, Cl or a halogenated alkyl or alkoxy group with 1 to 12 C atoms;

a2) 2 to 90% by weight of at least one compound of formula I having two polymerizable groups, wherein R has one of the meanings of P-(Sp-X—)$_n$; and b) 0.01 to 5% by weight of an initiator.

3. Polymer layers according to claim 2, wherein 10–65%, by weight of at least one compound of formula I is of the formula:

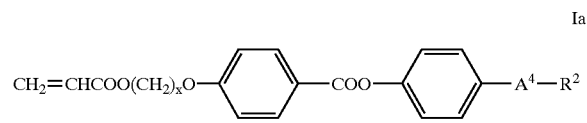

Ia wherein x is 1 to 12, R$^2$ is C$_{1\text{-}12}$ alkyl or alkoxy, and A$^4$ is 1,4-phenylene, trans-1,4-cyclohexylene or a single bond.

4. An anisotropic polymer layer exhibiting a tilted structure with an optical axis having a tilt angle θ relative to the plane of the layer greater than zero, obtained by polymerizing a polymerizable mesogenic material comprising at least one compound of the formula:

$$P\text{-}(Sp\text{-}X)_n\text{-}MG\text{-}R \qquad \qquad I$$

wherein

P is a polymerizable group,

Sp is a spacer group having 1 to 20 C atoms.

X is a group of —O—, —S—, —CO—, —COO—, —OCO—, —OCOO— or a single bond, n is 0 or 1, MG is a mesogenic or mesogenicity supporting group, and R is an alkyl radical with up to 25 C atoms optionally unsubstituted, mono- or polysubstituted by halogen or CN, optionally one or more non-adjacent $CH_2$ groups are replaced, independently, by —O—, —S—, —NH—, —N($CH_3$)—, —CO—, —COO—, —OCO—, —OCO—O—, —S—CO—, —CO—S— or —C≡C— where oxygen atoms are not linked directly to one another, or R is halogen, cyano or, independently, P-(Sp-X)$_n$— as defined in formula I; wherein the polymerizable mesogenic material comprises at least 95% by weight of polymerizable compounds, and the tilt angle θ in said layer varies continuously in a direction normal to the layer, starting from a minimum value $θ_{min}$ of 0–20 degrees at one side of the layer and ranging to a maximum value $θ_{max}$ of 20–90 degrees on the opposite side of the layer.

5. A polymer layer according to claim 4, wherein the polymerizable material comprises at least one compound of formula I having one polymerizable group and at least one compound of formula I having two polymerizable groups.

6. A polymer layer according to claim 4, wherein the polymerizable material comprises at least one compound of formula I wherein the mesogenic group MG is of the formula:

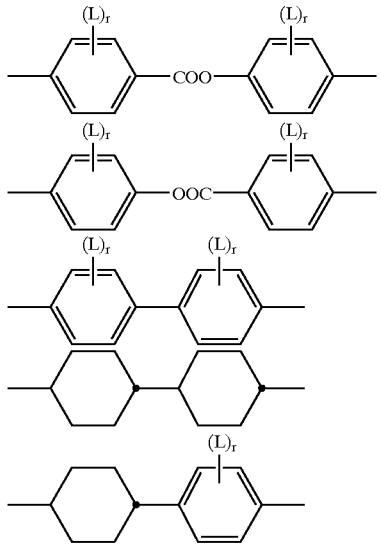

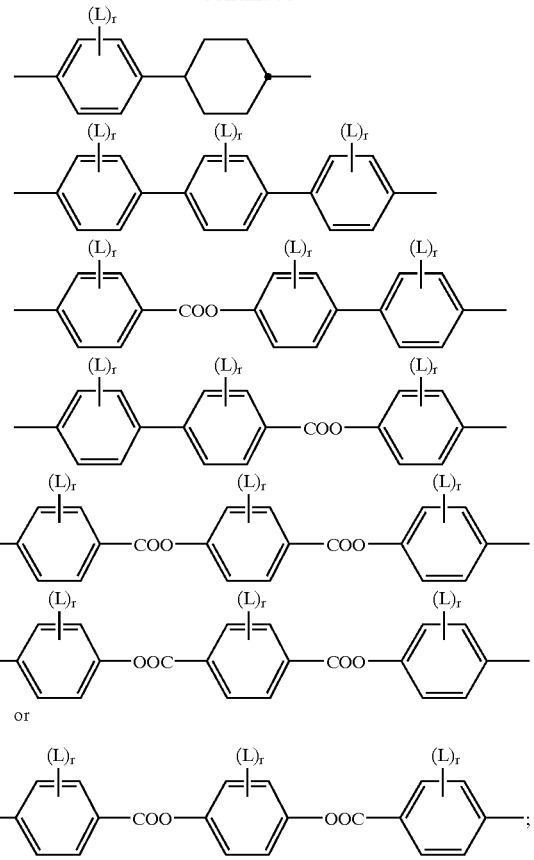

or where L is: F, Cl, CN, or a fluorinated alkyl, alkoxy or alkanoyl group with 1 to 4 C atoms, and r is 0, or 2.

7. A polymer layer according to claim 4, wherein the polymerizable material comprises at least one compound of formula I where P is:

$CH_2$=CW—COO—, WCH=CH—O—,

or $CH_2$=CH-Phenyl-(O)$_k$— with W being H, $CH_3$ or Cl and k being 0 or 1.

8. A polymer layer according to claim 4, wherein the polymerizable mesogenic material comprises at least one compound of formula:

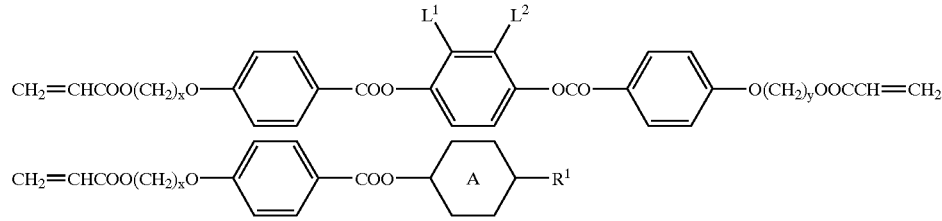

-continued

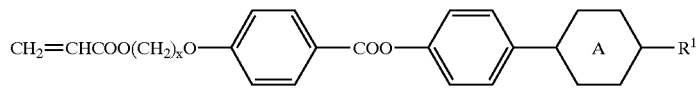

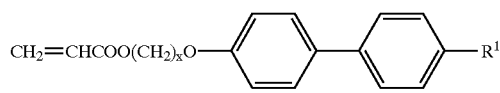

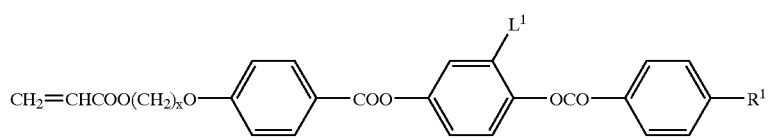

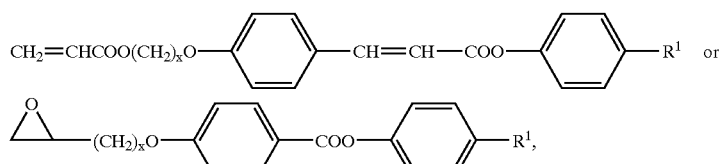

wherein x and y are, independently, 1 to 12, A is a 1,4-phenylene or 1,4-cyclohexylene group, $R^1$ is halogen, cyano or an optionally halogenated alkyl or alkoxy group with 1 to 12 C atoms, and $L^1$ and $L^2$ are, independently. H, F, Cl, CN, or a halogenated alkyl, alkoxy, or alkanoyl group with 1 to 7 C atoms.

9. A polymer layer according to claim 4, wherein the polymerizable material comprises at least one compound of the formula:

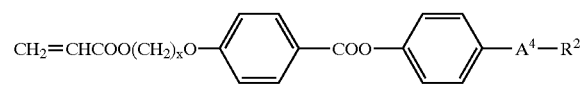

Ia wherein x is 1 to 12, $R^2$ is $C_{1-12}$ alkyl or alkoxy, and $A^4$ is 1,4-phenylene, trans-1,4-cyclohexylene or a single bond;
at least one direactive compound of formula I; and at least one dielectrically positive monoreactive compound of formula I.

10. A polymer layer according to claim 4, wherein the polymerizable mesogenic material is a mixture of:
a1) 10 to 99% by weight of at least one mesogen according to formula I having one polymerizable functional group,
a2) 0 to 70% by weight of at least one mesogen according to formula I having two or more polymerizable functional groups, and
b) 0.01 to 5% by weight of an initiator.

11. A liquid crystal display comprising a display cell and at least one polymer layer according to claim 4.

12. A polymer layer according to claim 4, wherein the mesogenic or mesogenicity supporting group is a compound of formula:

$$-(A^1-Z^1)_m-A^2-Z^2-A^3-$$ II wherein
$A^1$, $A^2$ and $A^3$ are, independently, 1,4-phenylene where one or more CH groups optionally replaced by N, 1,4-cyclohexylene, optionally, one or two non-adjacent $CH_2$ groups are replaced by O and/or S, 1,4-cyclohexenylene or naphthalene-2,6-diyl, optionally these groups are unsubstituted, mono- or polysubstituted with a halogen, a cyano, or a nitro group, or an alkyl, alkoxy or alkanoyl group having 1 to 7 C atoms, wherein one or H atoms may be substituted by F or Cl, $Z^1$ and $Z^2$ are each, independently, —COO—, —OCO—, —$CH_2CH_2$—, —$OCH_2$—, —$CH_2O$—, —CH=CH—, —C≡C—, —CH=CH—COO—, —OCO—CH=CH— or a single bond and
m is 0, 1 or 2.

13. A polymer layer according to claim 4, wherein n=1.

14. A polymer layer according to claim 4, wherein the tilt angle θ is 5–80° and the polymerizable mesogenic material comprises at least 96% by weight of polymerizable compounds.

15. A polymer layer according to claim 4, wherein the at least 95% by weight of polymerizable compounds are of the formula I.

16. A polymer layer according to claim 4, wherein the polymer layer is untwisted.

17. A polymer layer according to claim 4, wherein the polymerizable material comprises 1 to 80% by weight of at least one dielectrically positive monoreactive mesogenic compound.

18. A polymer layer according to claim 17, wherein said dielectrically positive monoreactive mesogenic compound has a dielectric anisotropy Δ∈>1.5.

19. A polymer layer according to claim 17, wherein said dielectrically positive monoreactive mesogenic compound has a polar terminal group of CN, F, Cl, $OCF_3$, $OCF_2H$, $OC_2F_5$, $CF_3$, OCN or SCN.

20. An anisotropic polymer layer exhibiting a tilted structure with an optical axis having a tilt angle θ relative to the plane of the layer greater than zero, obtained by polymerizing a polymerizable mesogenic material comprising at least one compound of the formula:

$$P-(Sp-X)_n-MG-R$$ I wherein

P is a polymerizable group,

Sp is a spacer group having 1 to 20 C atoms,

X is a group of —O—, —S—, —CO—, —COO—, —OCO—, —OCOO— or a single bond, n is 0 or 1, MG is a mesogenic or mesogenicity supporting group, and R is an alkyl radical with up to 25 C atoms optionally unsubstituted, mono- or polysubstituted by halogen or CN, optionally one or more non-adjacent $CH_2$ groups are replaced, independently, by —O—, —S—, —NH—, —N($CH_3$)—, —CO—, —COO—, —OCO—, —OCO—O—, —S—CO—, —CO—S— or —C≡C— where oxygen atoms are not linked directly to one another, or R is halogen, cyano or, independently, P-(Sp-X)$_n$— as defined in formula I; wherein the polymerizable mesogenic material comprises at least 95% by weight of polymerizable compounds and wherein the polymerizable mesogenic material is a mixture of:

a1A) 10 to 65%, by weight of at least one compound of formula I is of the formula:

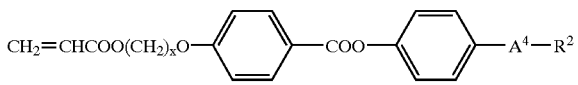

Ia wherein x is 1 to 12, $R^2$ is $C_{1-12}$ alkyl or alkoxy, and $A^4$ is 1,4-phenylene, trans-1,4-cyclohexylene or a single bond;

a1B) 5 to 40% by weight of at least one compound of formula I having one polymerizable group, wherein R is CN, F, Cl or a halogenated alkyl or alkoxy group with 1 to 12 C atoms;

a2) 2 to 90% by weight of at least one compound of formula I having two polymerizable groups, wherein R has one of the meanings of P-(Sp-X—)$_n$; and b) 0.01 to 5% by weight of an initiator.

* * * * *